United States Patent
Saito et al.

(10) Patent No.: US 8,899,487 B2
(45) Date of Patent: Dec. 2, 2014

(54) BIOMETRIC IDENTITY VERIFICATION SYSTEM AND METHOD

(75) Inventors: Tamio Saito, San Jose, CA (US); Marcello Soliven, San Jose, CA (US)

(73) Assignee: IVI Holdings Ltd., Boulder, CO (US)

( * ) Notice: Subject to any disclaimer, the term of this patent is extended or adjusted under 35 U.S.C. 154(b) by 0 days.

(21) Appl. No.: 12/064,234

(22) PCT Filed: Aug. 18, 2006

(86) PCT No.: PCT/US2006/032346
§ 371 (c)(1),
(2), (4) Date: Feb. 19, 2008

(87) PCT Pub. No.: WO2007/022423
PCT Pub. Date: Feb. 22, 2007

(65) Prior Publication Data
US 2008/0223925 A1   Sep. 18, 2008

Related U.S. Application Data

(60) Provisional application No. 60/709,981, filed on Aug. 18, 2005.

(51) Int. Cl.
| | |
|---|---|
| G06K 19/06 | (2006.01) |
| G06K 5/00 | (2006.01) |
| G06K 9/00 | (2006.01) |
| G06F 7/04 | (2006.01) |
| G06F 21/00 | (2013.01) |
| G07C 9/00 | (2006.01) |
| G06Q 20/34 | (2012.01) |
| G06Q 20/40 | (2012.01) |
| G07F 7/10 | (2006.01) |

(52) U.S. Cl.
CPC .......... *G07C 9/00087* (2013.01); *G06Q 20/341* (2013.01); *G06Q 20/40145* (2013.01); *G07F 7/1008* (2013.01); *G07C 2009/00095* (2013.01)

USPC .......... 235/492; 235/382; 382/115; 340/5.82; 713/186

(58) Field of Classification Search
USPC ........ 235/487, 492, 379, 380; 340/5.82–5.84, 340/10.1, 572.1, 5.52, 5.53, 5.61; 713/185, 713/186; 726/9, 20; 902/3, 5; 382/115, 124; 705/64, 65, 41
See application file for complete search history.

(56) References Cited

U.S. PATENT DOCUMENTS 5,623,552 A * 4/1997 Lane .............................. 382/124
5,991,617 A * 11/1999 Powell .......................... 455/410

(Continued)

FOREIGN PATENT DOCUMENTS

JP         2004298465 A  * 10/2004

*Primary Examiner* — Michael G Lee
*Assistant Examiner* — Suezu Ellis
(74) *Attorney, Agent, or Firm* — Marsh Fischmann & Breyfogle LLP; Daniel J. Sherwinter

(57) ABSTRACT

A card authenticates a cardholder. The card includes a substrate, a sensor module, a wireless transceiver module, and a power circuit. The sensor module includes (a) a biometric sensor adapted to detect biometric information from a person's body, (b) a processor unit adapted to authenticate the person in response to the detected biometric information and generate an authentication signal representing an authentication result, and (c) a memory adapted to store biometric information of a specific individual associated with the card. The wireless transceiver module transmits signals received from the processor unit and receives a wirelessly-transmitted power signal. The power circuit generates at least one supply voltage from the received power signal and provides the supply voltage to the sensor module. An electronic passport is embedded with the card, and a terminal module is used for wirelessly transmitting power to and receiving signals from the electronic passport.

11 Claims, 14 Drawing Sheets

(56) References Cited

U.S. PATENT DOCUMENTS

| | | | | |
|---|---|---|---|---|
| 6,070,804 | A * | 6/2000 | Miyamoto | 235/494 |
| 6,194,993 | B1 * | 2/2001 | Hayashi et al. | 340/10.34 |
| 6,378,774 | B1 * | 4/2002 | Emori et al. | 235/492 |
| 6,434,259 | B1 * | 8/2002 | Hamid et al. | 382/115 |
| 6,466,126 | B2 * | 10/2002 | Collins et al. | 340/333 |
| 7,049,958 | B2 * | 5/2006 | Fischer et al. | 340/539.17 |
| 7,350,717 | B2 * | 4/2008 | Conner et al. | 235/492 |
| 7,424,134 | B2 * | 9/2008 | Chou | 382/115 |
| 2004/0129787 | A1 * | 7/2004 | Saito et al. | 235/492 |
| 2004/0179718 | A1 * | 9/2004 | Chou | 382/115 |
| 2005/0226468 | A1 * | 10/2005 | Deshpande et al. | 382/115 |
| 2005/0232471 | A1 * | 10/2005 | Baer | 382/115 |
| 2005/0240778 | A1 * | 10/2005 | Saito | 713/186 |
| 2007/0034700 | A1 * | 2/2007 | Poidomani et al. | 235/492 |
| 2008/0017703 | A1 * | 1/2008 | Lu et al. | 235/379 |
| 2008/0237357 | A1 * | 10/2008 | Stranges et al. | 235/492 |

* cited by examiner

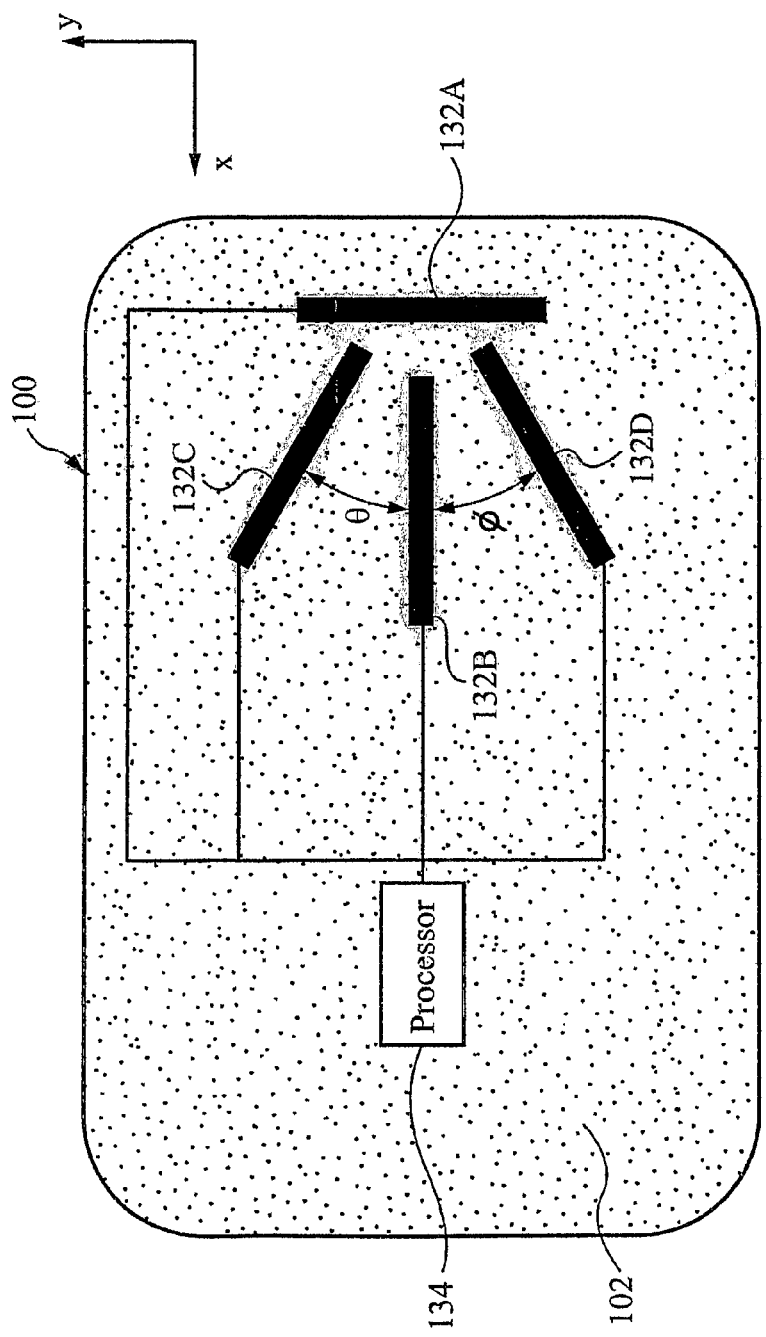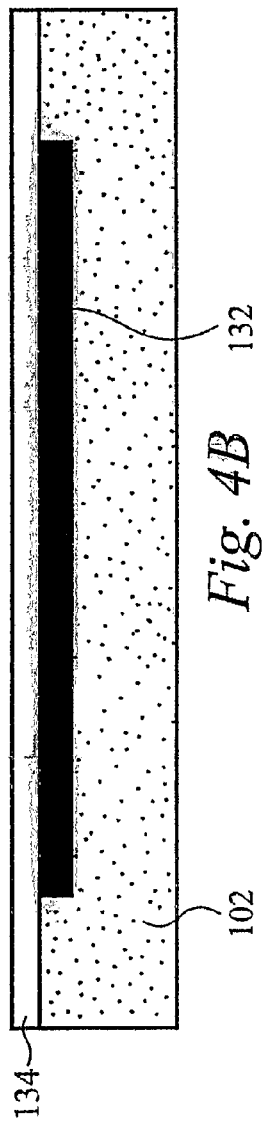
Fig. 4A
Fig. 4B

BIOMETRIC IDENTITY VERIFICATION SYSTEM AND METHOD

FIELD OF THE INVENTION

The invention relates to identity verification systems. More particularly, the invention relates to a biometric identity verification card system and method.

BACKGROUND OF THE INVENTION

Smart cards, which are also referred to as integrated circuit (IC) cards, typically include a microprocessor and memory in their plastic body and are capable of data processing required for the specific purpose of the cards. The conventional smart cards are typically "credit-card" sized, and ranging from simple memory-type smart cards storing user identification information to high-end smart cards with a sophisticated computational capacity. Typically, a card reader is used to read the stored information associated with the cardholder, such as a user name, account number, personal identification number (PIN), password, and the like. The card reader may be contact type or contactless type. The authentication process is typically performed after the necessary information is read from the smart card to the card reader, using the card reader or other authentication device communicating with the card reader, such as a local or remote authentication sever.

However, such smart cards can be stolen or counterfeited, and the authentication/verification system on which the smart cards are operating can be hacked, and the conventional smart card system is still vulnerable to identity theft and fraud. The ever increasing terrorist threat as well as the explosive rise in the crime of identity theft has left traditional identification methods ineffective.

What is needed is a robust and protected security system to authenticate and verify the identity of individuals through an identification card, in which neither the card nor the system can be hacked or otherwise compromised.

BRIEF DESCRIPTION OF THE INVENTION

A card which includes a substrate, a sensor module, a wireless transceiver module, and a power circuit. The sensor module includes (a) a biometric sensor adapted to detect biometric information from a person's body, (b) a processor unit adapted to authenticate the person in response to the detected biometric information and generate an authentication signal representing an authentication result, and (c) a memory adapted to store biometric information of a specific individual associated with the card. The wireless transceiver module transmits signals received from the processor unit and receives a wirelessly-transmitted power signal. The power circuit generates at least one supply voltage from the received power signal and provides the supply voltage to the sensor module. An electronic passport is embedded with the card, and a terminal module is used for wirelessly transmitting power to and receiving signals from the electronic passport or the card.

BRIEF DESCRIPTION OF THE DRAWINGS

The accompanying drawings, which are incorporated into and constitute a part of this specification, illustrate one or more embodiments of the invention and, together with the detailed description, serve to explain the principles and implementations of the invention.

In the drawings:

FIG. 4A illustrates an example authentication card having multiple swipe sensors in accordance with an embodiment of the invention.

FIG. 4B illustrates a cross section of the card in FIG. 4A in accordance with an embodiment of the invention.

DETAILED DESCRIPTION

Embodiments of the invention are described herein in the context of an identification card, and a method, system, and apparatus for authenticating a person holding the card or electronic passport. Those of ordinary skill in the art will realize that the following detailed description of the invention is illustrative only and is not intended to be in any way limiting. Other embodiments of the invention will readily suggest themselves to such skilled persons having the benefit of this disclosure. Reference will now be made in detail to implementations of the invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with an embodiment of the invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 1A:
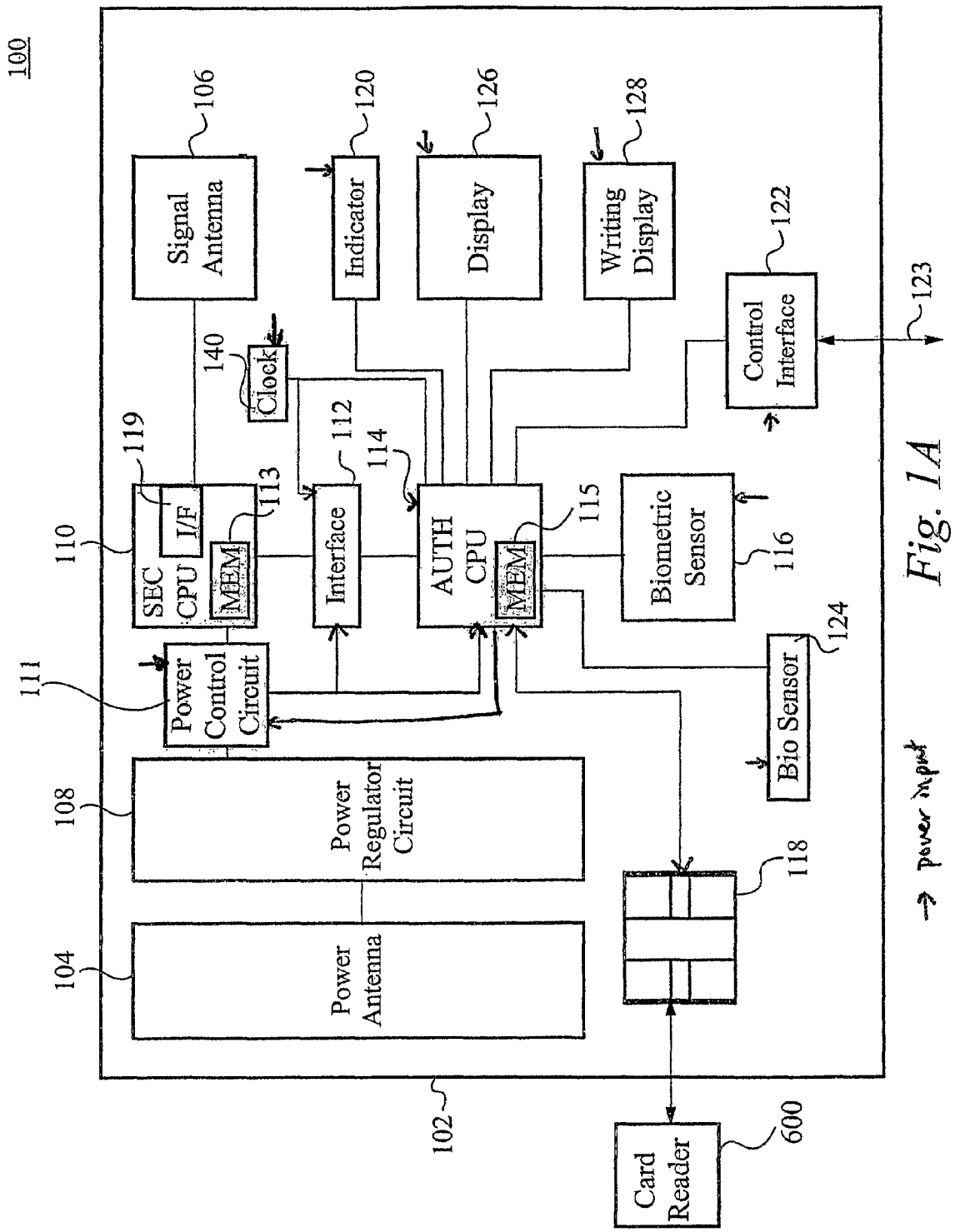
FIG. 1A illustrates a block diagram of an authentication card in accordance with an embodiment of the invention.

FIG. 1A schematically illustrates an authentication card 100 in accordance with an embodiment of the invention. As shown in FIG. 1A, the card 100 preferably includes a substrate 102, a power antenna 104, a signal antenna 106, a power regulator circuit 108, a security transaction CPU (also referred to as "SEC CPU") 110, a power control switch circuit 111, an interface control switch (or ISO bus switch) 112, an authentication CPU (also referred to as "AUTH CPU) 114, a biometric sensor module 116 and an ISO connector (ISO contact pads) 118. The SEC CPU 100 has a wireless (contactless) interface 119 coupled with the signal antenna 106. The card may further include an authentication indicator 120, a control interface 122, a biosensor 124, a display 126 and a writing display tablet 128. Although not particularly shown in FIG. 1A, each of the components in the card 100 may be powered by the power antenna 104 and/or the ISO contact 118. In accordance with an embodiment, the interface control switch 112 may be omitted, and the AUTH CPU 114 may set its signal output to the SEC CPU 110 in a floating state. This may be don using a tri-state terminal.

In an embodiment, the substrate of the card 100 is preferably made of a plastic material and has the overall appearance of a conventional credit card, of approximate dimensions as specified in ISO 7816. However, it should be noted that other dimensions and materials are contemplated and are not limited to that described herein. In an embodiment, the card 100 includes a magnetic stripe (as specified by ISO 7811-2 & 7811-6) on an underneath surface 103 (FIG. 1C) which may store encoded alphanumeric information about the card holder and any associated account. Thus, the card 100 may be used in a conventional magnetic stripe reader.

As shown in FIG. 1A, the card 100 preferably includes a set of ISO contact pads 118 which is coupled to the AUTH CPU 114. The ISO contact pads 118 provide the card 100 with an external communication by an electrical connection between the card 100 and corresponding contacts on a card reader (not shown). The power, timing (clock CLK) and/or control signals are received from the card reader 600 through the contact pads 118, and data may be exchanged between the card reader and the card. For example, such communication may use ISO 7816-3. In an embodiment, a CPU dedicated to the ISO contact 118 handles all processing of power, timing and/or control signals. In another embodiment, these functions are handled by the AUTH CPU 114.

The card 100 is able to operate in multiple modes of operability, one by which the card 100 can be powered and communicates through electrical (and physical) contact with a card reader (not shown) via the ISO contact 118. The card 100 can also be wirelessly powered and communicates with the card reader 600 via wireless protocol such as ISO 14443. The card 100 may be used in the wired or wireless mode for conventional transactions in which merchant card readers are used (e.g. Micro-Payment, E-card, E-purse) in which a biometric scan may not be required. Of course, the same type of applications are contemplated in which a biometric scan is required for the transaction to take place.

As shown in FIG. 1A, the card 100 has a power switching configuration, where the power control switch 111 is provided between the power regulator circuit 108 and the SEC CPU 110. The power control switch 111 is controlled by the AUTH CPU 114. The power control circuit 111 is also coupled to power regulator circuit 108 from which the wirelessly transmitted power is received. In the wireless operation mode, each element of the card 110 receives the power via the power control switch circuit 111 as shown in FIG. 1A. The AUTH CPU 114 monitors how the card 100 receives power and data, and controls which components are to operate in accordance with the operation mode.

As mentioned above in accordance with an embodiment of the invention, there are three modes of operation: (1) contact communication mode (for example, ISO 7816 connection), (2) wireless authentication mode, and (3) wireless transaction mode (for example, ISO 14443 communication).

For example, if the ISO contact 118 receives power input (Vcc) (e.g. 3.3-5.0 Volts), the card 100 recognizes the contact mode regardless of any signal input from the signal antenna 106 (ISO 14443) or power input from the power antenna 104. That is, the contact mode has the priority over the wireless mode. The AUTH CPU 114 detects such an input via the ISO contact 118, and controls all operations of the card 100 according to the settings associated with the contact mode. In other words, in response to the power/signal input from the ISO contact 118, the card 100 operates in the contact mode. The scanned fingerprints are then authenticated through the contact mode using the connection through ISO 7816. A reset signal and a clock signal (external CLK) are also provided through ISO contact 118. The external clock signal is used in the contact mode, and supplied to each component through the AUTH CPU 114. The power received from the ISO contact 118 is also distributed to each component of the card 110 under the AUTH CPU 114's control. The power control circuit 111 may be used for such power distribution.

In an embodiment, when the card 100 is inserted into the card reader 600 a reset signal is sent from the card reader 600 to the AUTH CPU 114 and/or a dedicated ISO CPU (not shown). The card 100 then receives power from the card reader 600. The ISO CPU then responds with an Answer-to-Reset message and communicates PPS (Protocol and Parameters Selection) signals as needed. At the same time, AUTH CPU 114 goes into waiting state for receiving fingerprint data from the biometric sensor 118 to perform the authentication process.

Under the "wireless" mode, the card 100 receives the power wirelessly, also referred to as "Wireless Biometric Authentication." In the wireless biometric authentication mode, an internal clock signal and a reset signal are also generated on the card 110. The SEC CPU 110 is connected to the signal antenna 106 via interface 119. However, if the SEC CPU 110 is powered from the power control circuit 111 or the AUTH CPU 114, or any signal is supplied from the AUTH CPU 114 via the interface switch 112, communication through the signal antenna 106 is disabled. That is, the interface 119 may be activated if neither signal nor power is supplied to the SEC CPU 110. For example, the SEC CPU 110 may be configured such that the interface 119 is automatically shut down if any signal appears as an input from the AUTH CPU 114 or any power is being supplied to the SEC CPU 110.

In order to send the authentication result to the SEC CPU 110, the power is first supplied to both of the AUTH CPU 114 and the SEC CPU 110 to allow communication therebetween. After the authentication result is transmitted to the SEC CPU 110, and preferably after an acknowledgement is returned to the AUTH CPU 114, the power and signal inputs to the SEC CPU 110 are terminated. This may be done by controlling the power control circuit 111 and shutting down (placing in a floating condition) in the interface control switch 112. Such power/signal shut down activates or enables the interface 119, and the SEC CPU 110 is then able to wirelessly communicate via the signal antenna 106.

In accordance with an embodiment of the present invention, since the SEC CPU 110 requires very small power (for example, 1 mA), the SEC CPU 110 can obtain its operating power from the signal antenna 106 when the power from the power antenna 104 or from the AUTH CPU 114 is no longer received. For example, the SEC CPU 110 may include a receiver circuit (capacitance) tuned in to the frequency of the signals on the signal antenna 106. Thus, as soon as the SEC CPU 110 receives signals via the signal antenna 106, the SEC CPU 110 is "self-powered" and operates without any communication with other components of the card 100 (isolated from all other elements). Thus, no unauthorized access or hacking is allowed on the card 100.

In addition, since the operation of the SEC CPU 110 is controlled by both of the on-card signals (internal control) and the wireless signals (external control), the internal clock and the external clock preferably have the same frequency such that the control of the SEC CPU 110 is seamlessly changed from on-card (internal) to wireless (external). Alternatively, a clock signal converter such as a clock divider may be implemented in the SEC CPU 110 if the internal and external clocks have different frequencies.

Another "wireless" mode in accordance with an embodiment of the present invention is referred to as "Wireless Signal Mode without Authentication," or "ISO 14443 communication mode." In that embodiment, there is little or no contact power received from the ISO contact pads 118, and/or the power from the power antenna 104 is below a set voltage threshold to enable the AUTH CPU 114 to operate the biometric sensor. The card 100 then operates in the "wireless signal without fingerprint authentication" mode and is able to transmit signals via the signal antenna 106 without requiring a biometric scan authentication. This embodiment is useful in micropayment, e-purse and/or e-transportation applications in which the card 100 receives the lower voltage (e.g. from the toll booth) and activates the SEC CPU 110 to communicate with the card reader (e.g. in the toll booth) to deduct funds from the owner's bank account. In accordance with an embodiment of the present invention, the threshold voltage may be 2 volts, although other threshold voltages are contemplated depending on the application and desire of the developer.

Figure 1B:
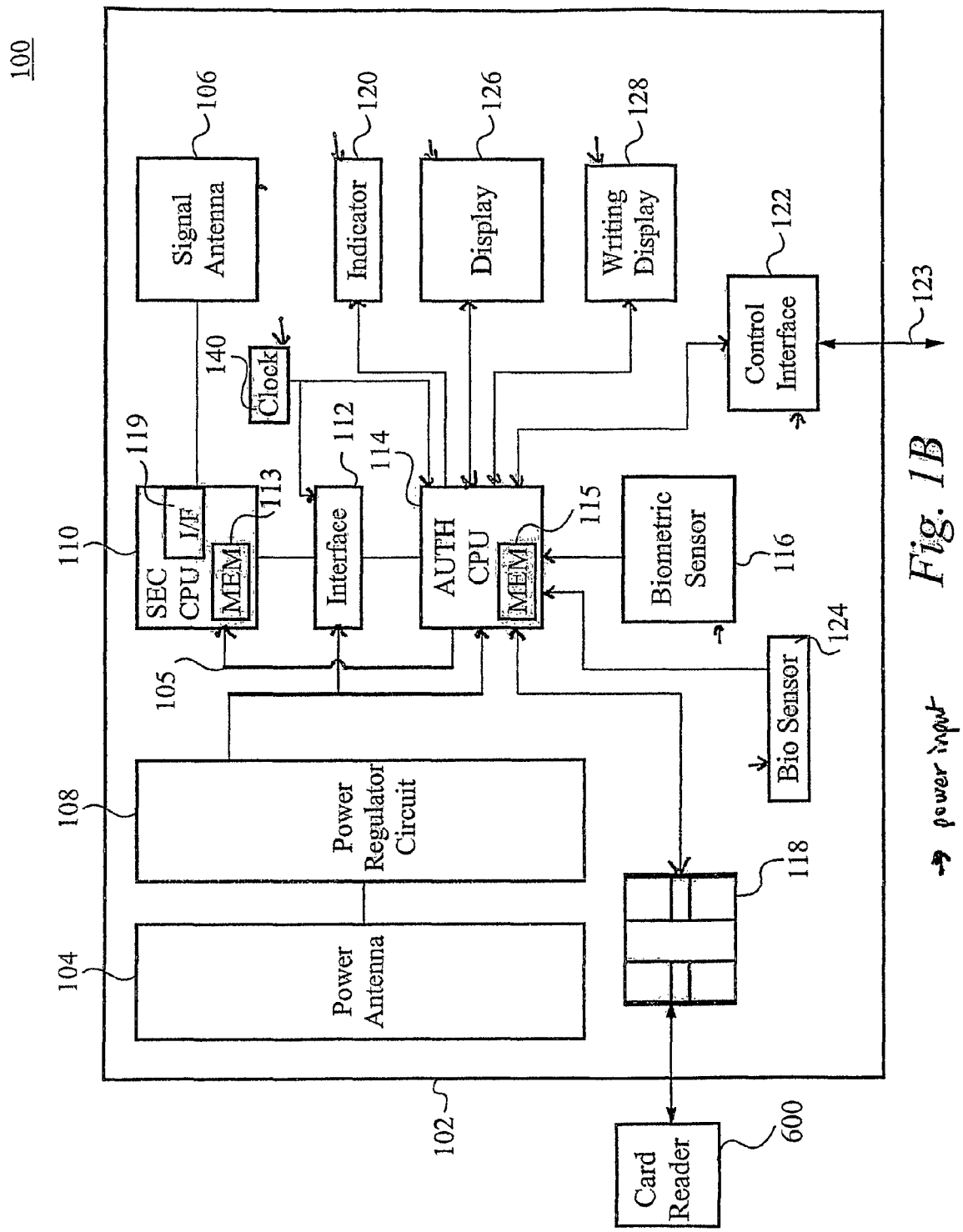
FIG. 1B illustrates a block diagram of an authentication card in accordance with an embodiment of the invention.

In accordance with an embodiment of the invention, as shown in FIG. 1B, the power control circuit 111 may be omitted, and the AUTH CPU 114 may directly control the power input to the SEC CPU 110. In this embodiment, the power from the power regulator circuit (voltage level controller) 108 is directly input to the AUTH CPU 114 (and to other on-card components except the SEC CPU 110). The SEC CPU 110 receives the power directly from the AUTH CPU 114 as shown in line 105. The SEC CPU 110 receives signals from the AUTH CPU 114 via the interface 112. Such a configuration is possible since the SEC CPU 110 is operable at a low power (e.g, 1 mA), compared with the AUTH CPU 114 (e.g, 10 mA).

If the card 100 receives power wirelessly through the power antenna 104, the power control circuit 111 will prevent any signals from being transmitted or received via the ISO contact 118. Thus, information is sent from the SEC CPU 110 to the AUTH CPU 114, whereby the AUTH CPU 114 then communicates with the ISO contact 118. and/or terminates power received at the ISO contact 118 itself. This additional security measure prevents the SEC CPU 110, when operating in the wireless mode, from being accessed via the ISO contact 118. Additionally, when the card 100 is operated in the "contact" mode (i.e. via the ISO contact 118), the signal antenna 106 is disabled to prevent any wireless unauthorized access to the SEC CPU 110. Alternatively, the SEC CPU 110 is able to transmit information via the signal antenna 106 in the contact mode.

In an embodiment, the power control circuit 111 or the AUTH CPU 114 can also switch off power received wirelessly from the power antenna 104 if the card 100 is connected to the card reader terminal 600 via the ISO contact 118. This may prevent overloading of current through the card 100. In another embodiment, the control circuit 111 allows power to be received wirelessly from the power antenna 104 even though the card 100 is utilizing the ISO contact 118 (e.g. recharge battery in card in FIG. 13).

The biometric sensor 116 is coupled to the AUTH CPU 114 as shown in FIG. 1A. In an embodiment, the AUTH CPU 114 is a dedicated processor which serves to store and compare detected biometric information from the person's body (e.g. fingerprint) taken by the biometric sensor 116. It is also contemplated that the AUTH CPU 114 can also store and compare other bio-information detected from the biosensor 124, as discussed below.

The AUTH CPU 114 preferably includes a memory module 115, within or externally, which stores the fingerprint and/or other biometric information of the card's owner. Upon comparing the captured data with the stored data, the AUTH CPU 114 generates an authentication signal which indicates the result of the authentication (e.g. positive, successful authentication or negative, failed authentication). The AUTH CPU 114 operates by receiving power from the card reader 600 by the ISO contact 118 and/or the wireless power antenna 104. In an embodiment, the AUTH CPU 114 is the only processor which is directly connected to the ISO contact 118, although it is not necessary.

The SEC CPU 110 provides secure processing and storage of data pertaining to the card's owner. In an embodiment, the SEC CPU 110 stores information associated with the owner in a memory module 113, either internally or externally to the SEC CPU 110, and provides the stored information of the individual when the owner's fingerprint has been successfully authenticated. In another embodiment, the memory module 113 associated with the SEC CPU 110 stores only encryption keys or other codes used to access external network databases containing information associated with the owner.

The SEC CPU 110 is coupled to the AUTH CPU 114 via the interface control switch 112, whereby interface control switch 112 allows communication between the AUTH CPU 114 and the SEC CPU 110 only if the authentication result is positive. When the card 100 is powered via the ISO contact 118 and the owner's fingerprint is authenticated, the SEC CPU 110 provides the stored information of the owner to the AUTH CPU 114 through the interface control switch 112. When the card 100 operates in the wireless mode, the SEC CPU 110 transmits the stored information to the terminal module 600 (FIGS. 11 and 12) wirelessly via the signal antenna 106.

As stated, the SEC CPU 110 as well as the AUTH CPU 114 contain or are coupled to respective memory modules 113, 115. The memory 115 is typically a non-volatile memory and is adapted to store the biometric information of a specific individual associated with the card. The AUTH CPU 114 can utilize a volatile memory such as a random access memory (RAM) to perform authentication, execute instructions and/or process data.

The memory modules associated with the AUTH CPU 114 as well as the SEC CPU 110 may be one of or a combination of a random access memory (RAM) such as static RAM (SRAM) or dynamic RAM (DRAM), and a programmable read-only memory (PROM), such as an erasable and programmable read-only memory (EPROM), an electrically erasable and programmable read-only memory (EEPROM), a flash memory (or flash PROM), or the like. The RAM is used to cache the data for a software program, program code, program instructions, or the like. The PROM is used to store the authentication program and other application programs, an encryption application and related data and files, such as encryption key, and the above-mentioned biometric information and personal information of a specific individual. Since the software programs and information stored in the PROM should not be altered or tampered, the PROM is preferably one-time programmable or writable. In the case of an EEPROM or flash memory, its rewritable functionality may be disabled, for example, by fusing wires or fusing drivers.

Figure 2:
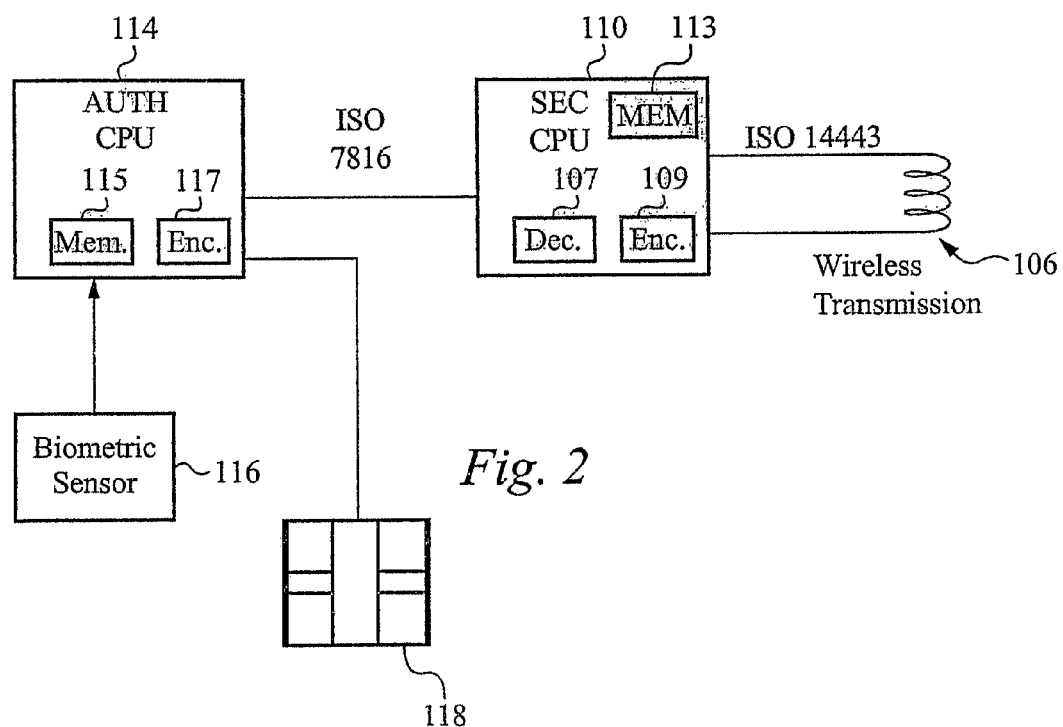
FIG. 2 illustrates a block diagram of an authentication CPU and security CPU of the card in accordance with an embodiment of the invention.

FIG. 2 schematically illustrates an example of the SEC CPU 110 and the AUTH CPU 114 in accordance with an embodiment of the invention. As shown in FIG. 2, the AUTH CPU 114 preferably includes the memory 115 as well as an encryption component 117 within, although such components may be externally coupled to the AUTH CPU 114. In another embodiment, the AUTH CPU 114 may be implemented as a general purpose CPU having with specific software, an ASIC, a field programmable logic device (FPLD), or the like.

In addition, as shown in FIG. 2, the SEC CPU 110 preferably includes the memory 113 as well as a decryption module 107 and encryption module 109. The decryption module 107 decodes the encrypted signals sent from the AUTH CPU 114. The encryption module 109 is coupled to the signal antenna 106, whereby output signals are encrypted by the encryption module 109. The SEC CPU 110 transmits and receives all signals and information in encrypted form to prevent any unauthorized interception of the secured information.

One method of encrypting the signal between the AUTH CPU 114 and the SEC CPU 110 involves using a one time use, limited life authentication signal. The one-time use authentication signal can be captured biometric information taken from the sensor 118 which is then encrypted, whereby the encrypted signal is only valid in accessing the SEC CPU 110 once. Alternatively, the authentication signal is a randomly generated code. The generated authentication signal, once sent to the SEC CPU 110, is a one-time use signal in which the authentication signal cannot be used again to access the SEC CPU 110. In addition, the authentication signal is preferably "alive" only for a very short period of time, whereby the SEC CPU 110 can only be accessed using the generated authentication signal within a certain amount of time after being transmitted from the AUTH CPU 114. The period of time can range from nanoseconds to one or more seconds and can be predetermined or randomly generated as well. The one-time use authentication signal is preferably encrypted, and is virtually invisible to any unauthorized viewing.

In an embodiment, the one-time password is by the AUTH CPU 114 or other processor decrementing a sequence number. This is done by combining a seed value with a secret password that only the AUTH CPU 114 knows. This combination is then run through either MD4, MD5 or other appropriate hash functions repeatedly to generate the sequence of passwords.

Upon the authentication signal being successfully sent to the SEC CPU 110, the SEC CPU 110 compares the sent information with that stored in the SEC CPU 110 (e.g. the captured biometric information) and then sends an acknowledgment signal to the AUTH CPU 114 if the information matches. Upon receiving the acknowledgement, the AUTH CPU 114, via interface control switch 112, closes communication with the SEC CPU 110 such that the SEC CPU 110 can only transmit encrypted information via the signal antenna 106. The encrypted data sent by the SEC CPU 110 can be a one-time, limited life-time signal as well, as discussed above. Alternatively, or additionally, the encrypted data sent via the signal antenna 106 may include the SEC CPU definitive ID code.

The authorization signal and acknowledgement is preferably sent from the AUTH CPU 114 to the SEC CPU 110 via a communication bus (wire). In accordance with an embodiment of the invention, the system may be compatible with the International Organization for Standardization (ISO) standards. For example, the communication bus between the SEC CPU 110 and AUTH CPU 114 may be compatible with ISO 7816. It should be noted that the card 100 itself as well as the components can utilize other ISO standards depending on the application in which the card 100 is used.

In accordance with embodiments of the invention, the biometric information detection and the authentication process using the biometric information are preferably performed on-board the card 100. That is, the authentication of a cardholder is performed without externally communicating the sensitive information, such as fingerprint patterns and personal information, to an external system beyond the terminal module 600. Thus, such sensitive information is preferably confined within the card 100.

In the case where the authentication result and related personal information is wirelessly transmitted, the transmission signal preferably has a very short range, typically the order of millimeters, and thus is only received by the terminal module 600 on which the card 100 is properly placed or brought in close proximity to. Accordingly, the authentication process and personal information retrieval can be done locally, and the sensitive information does not have to travel through the airwaves, or through a network system such as the Internet. In addition, since the full authentication can be performed locally (on-board), it is not affected by any accident or unavailability of access to an external network system or a central database. However, it is contemplated that the card can be used to transmit signals over a long range, as discussed below.

Referring back to FIG. 1A, the card 100 utilizes a clock circuit 140 generates a clock signal which is supplied directly or indirectly to all components in the card 100. The clock signal ensures that all of the components in the card 100 synchronously operate. For clarity, all such clock signal inputs are not illustrated in FIG. 1A. As stated above, the card 100 is able to operate in the wired mode and/or wireless mode. When operating in the wired mode, the clock signal is preferably received externally from the signals provided from the external card reader 600 via the ISO contact 118.

When the card 100 operates in the wireless mode, the clock signal is preferably generated internally by the clock circuit 140. A tri-state switch (not shown) is preferably coupled to the clock circuit 140 to selectively enable the internal clock circuit 140 to generate the clock signal only when the card 100 is operating in the wireless mode. Alternatively, the switch is internal to the clock circuit 140 or within any of the other components of the card 100. The clock circuit 140 is preferably made of a material other than crystal, such as ceramic resonator or RC timer, although crystal based clocks are contemplated, Preferably, the internal clock circuit 140 is configured to generate the clock signal based on the frequency of the external power signal, whereby the clock circuit 140 is preferably coupled to the power antenna 104. For example, if the power antenna 104 (FIG. 3) complies with the ISO 14443 standard, the power signal received may have 13.56 MHz oscillation, which may be then used by the internal clock circuit 140 to generate the clock signal at the corresponding frequency of 13.56 MHz. However, the clock signal generated by the clock circuit 140 should match the clock signal as if the card 100 is wired to the external card reader 600. In an embodiment, the clock signal generated by the clock circuit 140 can be approximately 4 MHz or any other frequency depending on the application.

The card 100 preferably also includes a reset circuit embedded therein which automatically initializes one or more of the components of the card 100 in response to a predetermined level of an increasing supply voltage (e.g. 1.8 V) after the supply voltage is shut down. The reset circuit is preferably within the power control circuit 111, whereby initialization is typically done by initializing or resetting the AUTH CPU 114 of the card. Alternatively, the reset circuit is a stand alone circuit or is incorporated in any of the components in the card 100. The AUTH CPU 114 may thus be initialized using the threshold voltage of the increasing supply voltage (e.g. 2.0 V), and then the SEC CPU 110 may be initialized using a reset signal supplied from reset circuit in the AUTH CPU 114 or other appropriate component. In an example, the AUTH CPU 114 may be activated using a reset signal which may be generated by initially touching the biometric scanner 118 with the live finger.

Figure 1C:
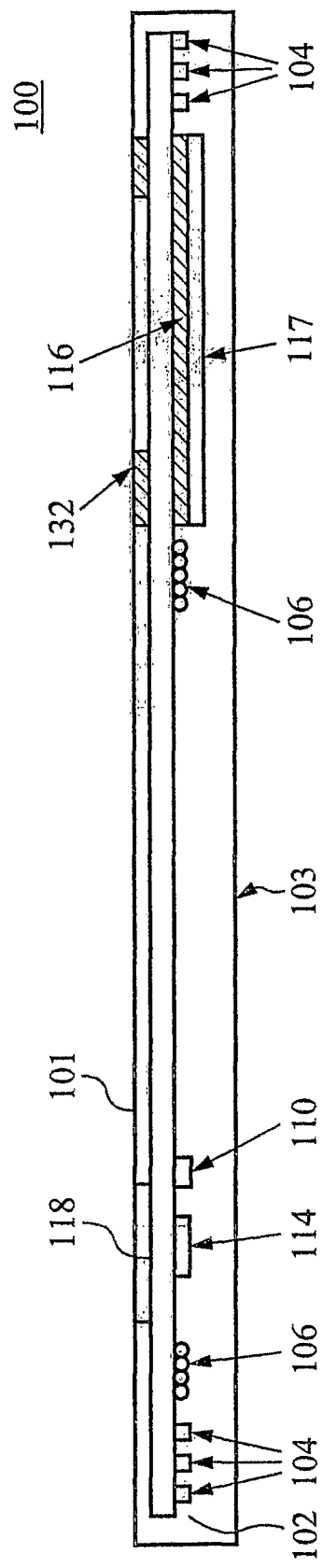
FIG. 1C illustrates a cross sectional view of the authentication card in accordance with an embodiment of the invention.

FIG. 1C illustrates a cross sectional view of the authentication card 100 in accordance with an embodiment of the invention. As shown in FIG. 1C, the card 100 is shown to have an upper surface 101 and a lower surface 103. A PCB 118 is disposed between the upper surface 101 and the lower surface 103 as shown in FIG. 1C, whereby the PCB 118 provides the required electrical connections between the various electronic components, as well as a surrounding electrostatic discharge ground contact surrounding the active region of sensor 116. The card 100 preferably includes the power antenna 104, signal antenna 106, SEC CPU 110, and AUTH CPU 114 within the substrate 102. The operative area of the sensor 116 is preferably accessible through an upper window 132 in the upper surface 101 and a lower window in the PCB material 118. In addition, a stiffener material 117 can be disposed underneath the sensor 116 to protect the sensor 116. The stiffener material 117 can be a hard polymer, glass epoxy, copper clad glass epoxy, BT resin, copper clad BT resin, stainless steal clad or sheet, aluminum clad, or anodized aluminum clad or sheet, or the like.

Further, an ESD gardling 132 is preferably disposed above the sensor 116 to provide ground to protect the user as well as the sensor 116. The ESD gardling can be made of a thermally matching mesh material which expands with heat produced in the card 100. As stated above, the card 100 can contain a magnetic strip in the lower surface 103 for conventional magnetic reading means. It should be noted that the configuration shown in FIG. 1C is only an embodiment, and the card 100 can include additional and/or alternative components disposed in the same or different manner as shown in FIG. 1C.

Figure 3:
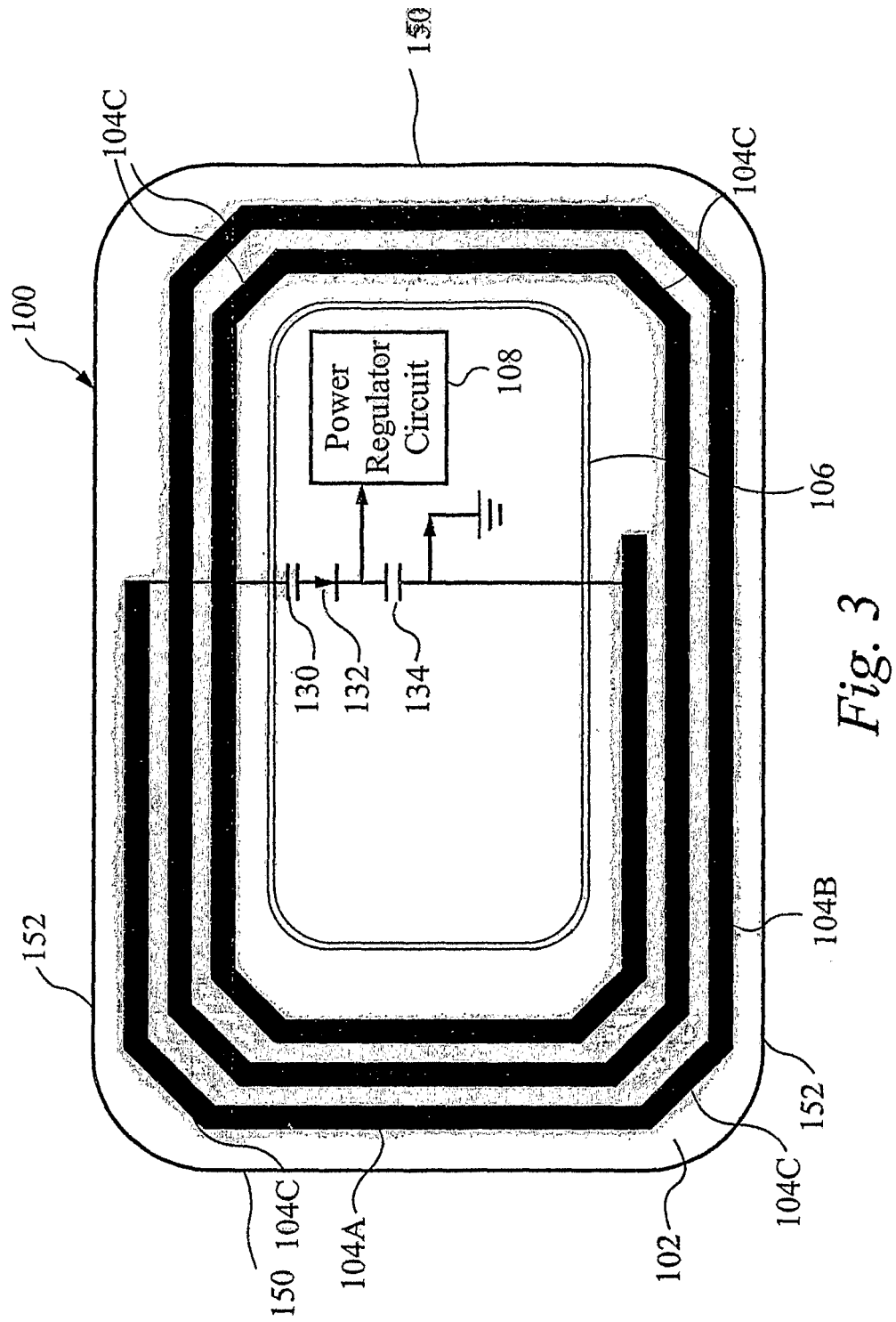
FIG. 3 illustrates a diagram of a power and signal antenna in the authentication card in accordance with an embodiment of the invention.

FIG. 3 illustrates the power antenna and signal antenna configuration of the rectangular card 100 in accordance with an embodiment of the invention. As shown in FIG. 3, the power antenna 104 disposed along outlining boundaries of the card substrate 102. The power antenna 104 is shown to have three turns with respect to the center of the card 100. It is contemplated that the power antenna 104 can have as few as less than one turn and as many as over ten turns.

The power antenna 104 shown in the embodiment in FIG. 3 includes angled corners 104C which serve to reduce the power consumption of the antenna 104 to operate the components of the card 100. In particular, the card 100 in FIG. 3 includes a first antenna section 104A shown substantially parallel to the short sides 150 of the card body and a second antenna section 104B shown substantially parallel to the long sides 152 of the card body (and substantially perpendicular to the first antenna section 104A). An angled section 104C of the antenna is shown at an 45 degree angle to the first and second sections 104A, 104B, whereby the angled section 104C is connected to the first and second sections 104A, 104B. In the embodiment in FIG. 3, each corner of the power antenna has an angled configuration, although this is not necessary. In addition, it is contemplated that the angled section 104C can be configured at another angle other than 45 degrees with respect to either or both power antenna sections 104A, 104B.

The angled sections 104C reduce reflection of the current as the current flows between the first and second sections 104A, 104B. Such reduction in the current allows current to pass through the antenna 104 more efficiently and reducing resistance in the antenna 104C. The angled sections 104C also provide a greater open area between opposite sides of the antenna 104 in the substrate 102 of the card, thereby maximizing the output open voltage characteristic of the antenna 104. It should be noted that the angled portions 104C of the power antenna 104 can have rounded edges between the angled portions 104C and the straight portions 104A, 104B to further reduce reflection of current which passes through the power antenna 104.

The power antenna 104 shown in FIG. 3 is preferably made of pure copper material, whereby the material has a thickness of 30-500 microns. The power antenna 104 can be formed into the substrate 102 by any known methods, including, but not limited to, stamping, coining, routing, etching or the like. In an embodiment, the power antenna 104 is formed into the PCB material 118 (FIG. 1C). In another embodiment, the power antenna 104 is formed on a mesh or thermal interface material. The mesh material would allow the power antenna 104 as well as any of the other components in the substrate 102 to expand when heated without causing the card 100 to bow, crack, or otherwise become deformed. The mesh material should preferably have a thermal expansion coefficient which matches the ground or power pattern of the card 100 as well as the individual component materials.

Figure 10:
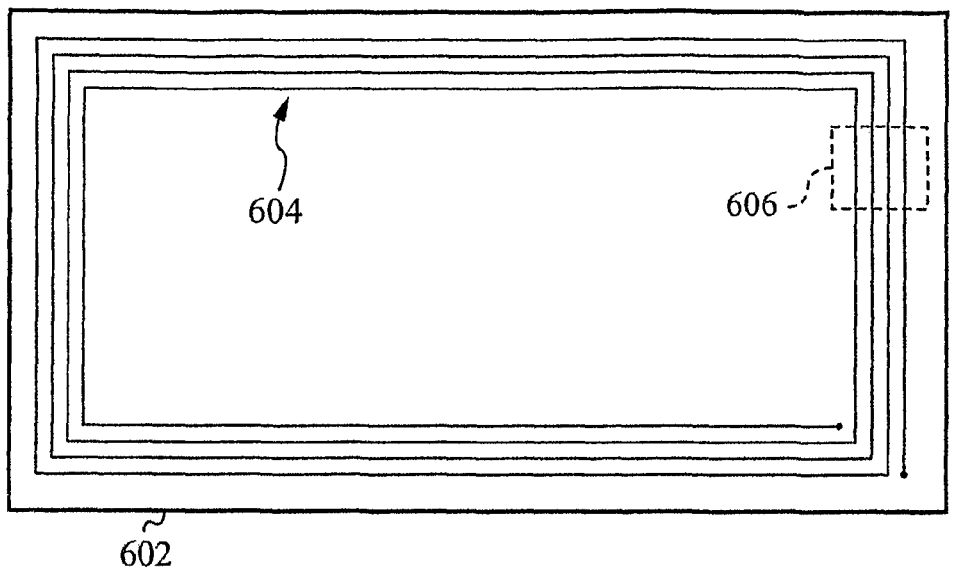
FIG. 10 illustrates a terminal module in accordance with an embodiment of the invention.
Figure 11:
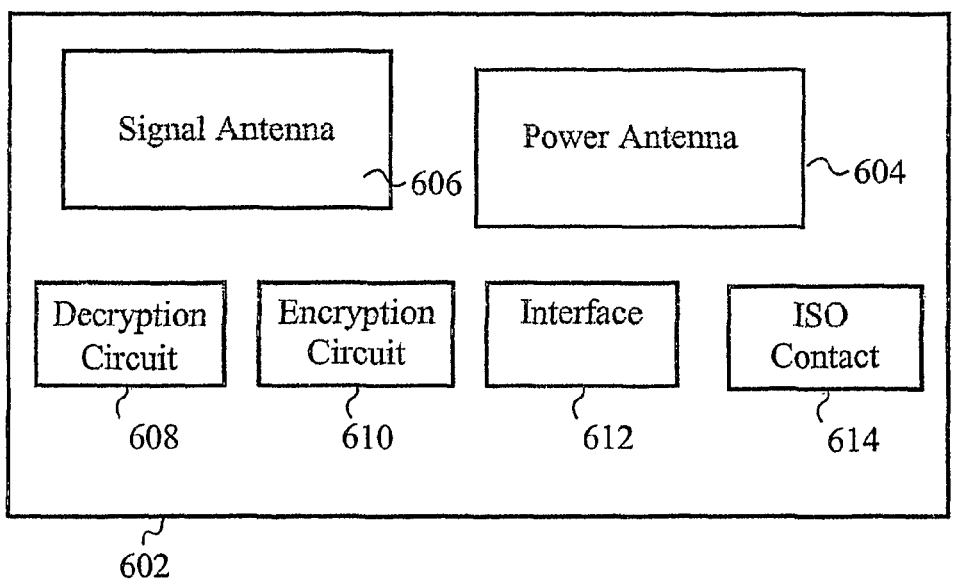
FIG. 11 illustrates a block diagram of the terminal module in accordance with an embodiment of the invention.

The card 100 includes the signal antenna 106 shown in FIG. 3, whereby the signal antenna 106 is preferably disposed in the card 100 and positioned within the most inner turn of the power antenna 104, although not necessarily. The signal antenna 106 is adapted to transmit and receive wireless signals with the external card reader 600 (FIGS. 10 and 11). It is contemplated that the signal antenna 106 is capable of transmitting and receiving electromagnetic waves, although the antenna 106 can additionally or alternatively transmit and receive ultrasonic waves, optical waves, infrared waves, radio frequency waves, or the like. Although it is preferred that the power antenna 104 and the signal antenna 106 are provided as separate and independent antennas, the power antenna 104 and the signal antenna 106 can alternatively be incorporated in a same antenna component.

Antennas with a lower turn number have a lower self inductance, thereby allowing the power antenna 104 to receive a higher current supply and a faster current ramp up (i.e., higher frequency response). In addition, the power antennas may be arranged such that the inside area of the antenna coil or loop (i.e., the cross section of the magnetic field generated by the power antennas 104) is maximized. Each of the power antennas 44 may be formed as an etched or printed pattern on a plastic or paper material. Each of the power antennas 44 may have a width equal to or greater than 1 mm.

The signal antenna 106 is preferably made of a magnetic wire, such as an enamel coated copper wire. However, it is contemplated that the signal antenna 106 can be made of any other appropriate material, so long as the antenna 106 does not induce interference with the card reader, internal components or any other associated devices. As shown in FIG. 3, the signal antenna 106 has two concentric turns. However, it is contemplated that the signal antenna 106 can have as many as 20 turns, depending on the card's application, without departing from the spirit and scope of the invention. In accordance with an embodiment of the invention, the signal antenna 104 is substantially smaller in overall length than the power antenna 106. Thus, the signals transmitted and received from the signal antenna 104 have a substantially shorter range such that the signals are only received in a proximity of the card reader 600, thereby preventing unauthorized receipt or intercept of the signals. In one example, the card 100 can be used in an application in which the transmitted signal can be detected at a maximum 10 mm distance from the signal antenna location, thereby making tapping of the signal very difficult.

In the embodiment in FIG. 3, the power antenna 104 is coupled to a rectifier diode 132, such as a Schottky diode, through a matching capacitor 130. The capacitor 130 is preferably a ceramic capacitor having a capacitance of 10 pF to 500 pF. It should be noted that other types and values of capacitors are contemplated and are appropriate depending on the application in which the card 100 is used. In an embodiment, the power circuit regulator 108 may be a dropper regulator, a switching regulator, or a fly back regulator. Alternatively, or additionally, regulator circuit 108 may have two outputs which provide a supply voltage of 3.3V and 1.8V. The number and levels of the supply voltages are not limited to two and may be provided depending on a specific application. Also, the differing voltages may be a different value than 3.3V and 1.8V.

Referring back to FIG. 1A, in accordance with an embodiment of the invention, the biometric sensor 30 is preferably a fingerprint sensor adapted to detect fingerprint patterns. The fingerprint sensor 30 can be of any type, but it is preferable to use sensors which can reliably detect fingerprint patterns even if being touched by a wet or dirty finger. In addition, it is preferable to use a finger print sensor 30 which can read the surface profile of a finger, i.e., the shape and distribution of valleys or mountains of the fingerprint patterns. For example, such a fingerprint sensor 30 may include a pressure sensor cell array or scanner, a micro electro mechanical array or scanner, a mechanical stress array or scanner, a distance measuring cell array or scanner, a capacitance measuring cell array, a micro switch array or scanner, an elasticity measuring array or scanner, or the like.

An embodiment of the fingerprint sensor 30 may also measure a temperature profile of the skin of the finger, for example, using an infrared detector array or scanner. In an embodiment, the biometric scanner 30 can incorporate a bioscanner to measure other characteristics of the user, as discussed in more detail below. In an embodiment, the biometric sensor 116 may include an image sensor such as a charge coupled device (CCD), optical camera, or metal oxide semiconductor (MOS) which is adapted to capture an image of the person. For example, the image may be the face, ear, iris, retina, or any other specific patterns uniquely characterizing the person. Additionally or alternatively, the biometric sensor 116 may include a genetic information detector adapted to detect genetic information or characteristics of the person, including DNA, RNA, proteins, enzymes, blood cells, and the like. In accordance with an embodiment of the invention, the biometric sensor 116 is located near an edge of the card although can be located elsewhere on the card 100 or card reader 600. This arrangement may make it easy to place other desired or necessary items or data on the face of the card 100.

Considering that the card 100 can be configured to be flexible in certain applications, the biometric sensor 30 can be made to be flexible as well. In an embodiment, the biometric sensor 30 may be made using a polymer material as its insulator or a substrate, or both. For example, the polymer material may be a polyimide, polyethylene terepthalate (PET), Polypropylene (PPT), Polycarbonate, Butadiene, Epoxy, Nylon, Teflon® (polymers of tetrafluoroethylene (PTFE) or polymers of fluorinated ethylene-propylene (FEP)), or the like.

The sensor 116 is not limited to the polymer material, but may be made of a thinned silicon substrate. The thinned silicon substrate is adapted to detect and digitize fingerprint patterns, by measuring capacitance, resistance, or the like. The details of the operation of the silicon sensor are not disclosed herein but are known in the art. The substrate may be made of crystalline, polycrystalline, or amorphous silicon. For example, the thickness of the thinned silicon substrate can be less than 200 microns, and more preferably, less than 100 microns. The thinning process may include chemical etching or gas-plasma etching.

FIG. 4A illustrates a schematic of the card utilizing swipe sensors in accordance with an embodiment of the invention. As shown in FIG. 4A, the card 100 includes multiple swipe sensors 132 embedded in the substrate 102. The swipe sensors 132 can be optical in nature, whereby the swipe sensors capture multiple images of the finger as the user slides or swipes her finger over the sensor 132. The sequence of captured images is then preferably combined to form one continuous fingerprint image which is then sent to the AUTH CPU 114. As shown in FIG. 4A, the swipe sensors 132 are coupled to a processor 134 which combines the individual captured images in forming an aggregate or combined fingerprint image.

In the embodiment shown in FIG. 4A, multiple swipe sensors 132A-132D are oriented at various angles with respect to one another. In particular, swipe sensor 132A is shown oriented parallel to the y-axis whereas swipe sensor 132B is oriented parallel to the x-axis. Additionally, swipe sensors 132C and 132D are shown at angles θ and φ with respectively to sensor 132B. The angles θ and φ can be of any value. The multiple sensors 132A-132D are arranged to increase the fingerprint capturing ability of the card 100. For example, conventional area-sensors may not properly capture the fingerprint unless the person's finger is precisely placed on the sensor. This may cause the card 100 to not authenticate the owner's fingerprint even if the rightful owner is placing some or most of her finger on the sensor. Thus, the swipe sensors 132A-132D are arranged at various angles on the card so that one or more of the swipe sensors 132A-132B will be able to capture the fingerprint in any direction. In an embodiment, multiple swipe sensors (e.g. sensor 132B and 132C) can each simultaneously capture same or different portions of the fingerprint as the finger is swiped. The captured portions are then combined by processor 134 to generate a composite of the fingerprint which is then able to be compared to the stored fingerprint by the AUTH CPU 114.

As shown in FIG. 4B, the swipe sensors 132A-132D are embedded in the substrate and positioned below the upper surface 134 so that dirt or grime are prevented from coming into contact with the sensors 132A-132D. Nonetheless, the swipe sensors 134A-134D are able to effectively capture the fingerprint data through the upper surface 134. It should be noted that although optical swipe sensors are described in the embodiment in FIGS. 3 and 4, it is contemplated that other types of sensors are able to be used, including but not limited to RF detector sensors, pressure sensors, capacitive sensors, inductive sensors or the like.

Referring back to FIG. 1A, the card 100 may further include the indicator 120 which is coupled to the AUTH CPU 114, whereby the AUTH CPU 114 would send an authentication signal to the indicator 120, indicating the authentication result. In accordance with an embodiment of the invention, the indicator 120 may include at least one light emitting diode (LED). For example, the indicator 120 has two LEDs with different colors (e.g., red and green), and if the person is successfully authenticated, the green LED may be illuminated, and if the person fails the authentication, the red LED. In addition, by using the LEDs in combination and/or using a different illumination mode such as blinking intervals, more information can be indicated than the simple pass/fail results corresponding to the number of the LEDs. It is also contemplated that any other appropriate light besides an LED is suitable.

In accordance with an embodiment of the invention, the card 100 may include a liquid crystal display (LCD) 126 (FIG. 1A) which would display the authentication result (e.g. "success", "authenticated", "error"), a digital picture of the owner, an uploaded image or other desired illumination. The card 100 may include a speaker within which emits a tone or sound corresponding to the authentication result.

In another embodiment, the card 100 includes the writing display 128 which has a writable surface in which the owner is prompted to write his or her signature into the display 128 using a stylus after submitting to the fingerprint scan. The signature is then captured by the display 128 and analyzed with a stored version of the owner's signature as a secondary security measure. It is contemplated that the display 126 discussed above and the writing display 128 can be incorporated into one component of the card 100. It is also contemplated that the display 126 and the writing display 128 can be incorporated along with the biometric sensor 116 into one component of the card 100.

As shown in FIG. 1A, the card 100 includes an external control interface 122. The control interface 122 shown in FIG. 1A is adapted to receive an external control signal 123 to configure and/or initialize the AUTH CPU 114 and/or the SEC CPU 110. Typically, the control interface 122 is used in the initial configuration of the card 100 when it is issued to the card's owner. For example, an external control signal 123 may be used to configure the hardware, software and/or firmware of the AUTH CPU 114 and SEC CPU 110, upload the program onto the processor units 110, 114 and/or their respective memory modules 113, 115, upload and store the biometric information templates of the specific individual in the SEC CPU memory 113, or the like. An encryption key and other data for the encryption system in the AUTH CPU 114 and/or the SEC CPU 110 may also be selected and/or configured using the external control signal 123 during the initial configuration process.

As stated above, personal information and/or templates of the card's owner may be stored in the memory 113 associated with the SEC CPU 110. For example, such personal identification information can include but is not limited to the name, user name, password, personal identification number (PIN), date of birth, place of birth, driver's license number, or the like. A photographic image of the owner may also be stored as part as the template. In addition, other related information, for example, the issue date of the card 100, the expiration date of the card 100, contact information of the owner, or the like, can be stored. If the card is used as a passport, for example, the history of travel or port entries, visa status, and/or other information may also be stored thereon.

It is preferred that the external connections to the control interface 122 are disabled after initially loading the owner's information onto the card 100. In an embodiment, external access to the control interface 122 is mechanically disconnected, whereby such mechanical disconnection may be temporary or permanent. Such a disconnection is preferable to prevent unauthorized access and alteration of the configuration and stored data in the card 100.

In an embodiment, if an update of the stored information is necessary or desirable, the external connection to the control interface 122 may be re-enabled only if the card 100 is successfully authenticated first. The control interface 122 may be implemented using an interface complying with the Joint Test Action Group (JTAG) standards, which defines one or more test access port architecture.

As stated above, the card 100 includes a biosensor 124 in an embodiment. For example, if the biometric sensor 116 is a fingerprint sensor, an unauthorized person might use a replica of the person's finger (or the body part cut from the body) to activate the card or utilize information stored therein. Thus, it is also important to make sure that a body from which the biometric information is to be detected is part of a live person for additional security. In an embodiment, the biosensor 124 and the biometric sensor 116 are combined into one sensing unit on the card.

In accordance with an embodiment of the invention, the biosensor 124 may be one of, or any combination of, an oxygen detector, a carbon dioxide detector, a thermometer, a moisture sensor, an infrared sensor, a voice sensor, a brainwave sensor, an electrocardiogram sensor, an electromagnetic filed sensor, or the like. Additionally or alternatively, the biosensor 124 may be an elasticity sensor adapted to detect elasticity of a member in contact therewith, or a blood flow sensor adapted to detect a blood flow in a body part in contact therewith. These biosensors may also be used alone or combined with one or more of the above described biosensors.

In an embodiment, the biosensor 124 may include a bio-response detector adapted to capture a reflex response of the person to a given stimulus. For example, a reflex reaction such as a change in an iris aperture in response to light intensity illuminated thereon can be used, and the biosensor 124 may include an image sensor adapted to capture an image of the iris, and a light emitter adapted to illuminate an eye of the person. If the biometric sensor 116 also includes an image sensor to capture the image of the person for biometric authentication, the biometric sensor 116 and the biosensor 124 may be integrated into one image sensor. For example, a static image may be processed for the pattern matching, and a motion (reaction) image responding to the stimulus may be processed for the "alive" test.

Preferably, the card 100 generates a positive authentication only if the person is successfully authenticated and also determined to be alive. The authentication result and the alive-test result may be indicated using the indicator 120 in a similar manner as described above.

As stated above, in an embodiment, the card 100 includes a display 126 thereon. The display 126 is preferably coupled to the processor unit 114, and adapted to display a photographic image including the specific individual's face if the person is authenticated. For example, an application of the card 100 is desirable to have a photographic image of the holder of the card 100, such a photographic image can be made available only if a person holding the card 100 is successfully authenticated. This feature make counterfeiting the card 100 more difficult. The holder's signature may also be displayed with the photographic image on the display 126. The photographic image and the optional signature to be displayed would be stored in the memory 118.

In an embodiment, the biometric sensor 116 and the display 126 may be integrated into one element. For example, the biometric sensor 116 may be substantially transparent and laid on the display 126. In addition, since the display 126 is activated and display the image only if the holder of the card is successfully authenticated (including passing the live test), the display 126 also functions as an indicator.

Figure 5:
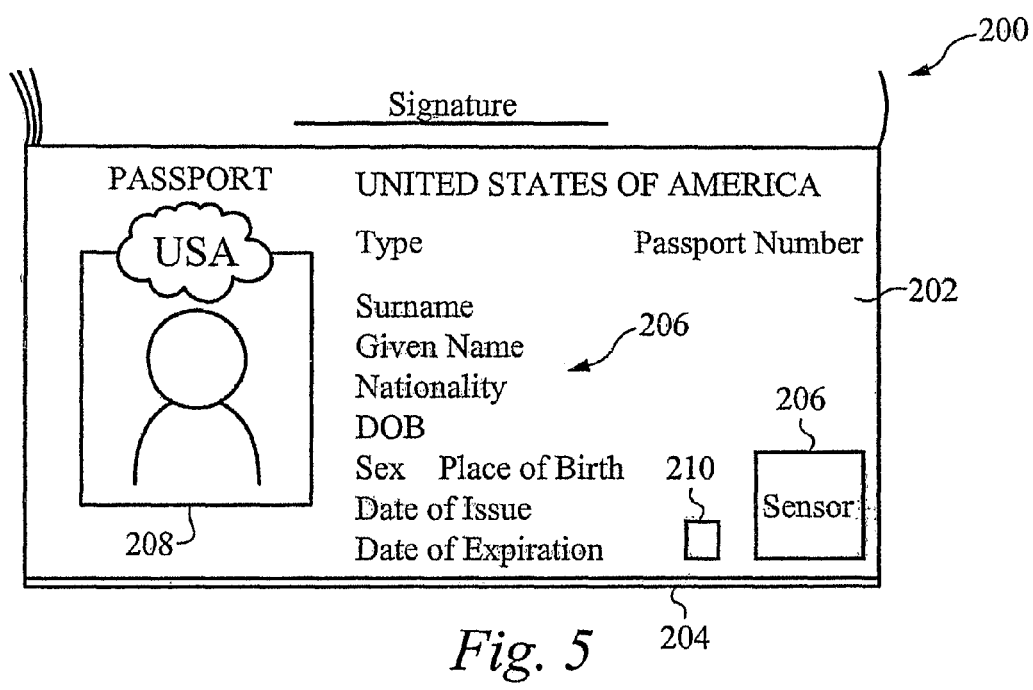
FIG. 5 illustrates an electronic passport including the card embedded therein in accordance with an embodiment of the invention.

FIG. 5 illustrates an electronic passport 200 including a card 202 within in accordance with an embodiment of the invention. For example, as shown in FIG. 5, the card may be embedded in a front or back cover 204 of the passport 200 or within a page of the passport 200.

The biometric sensor 206 shown in FIG. 5 can be visibly arranged on the inner side of the front or back cover 204 where the personal identification information of the passport holder is typically placed, but out of the way of the passport holder's photograph 208 and other personal information 206. As shown in FIG. 5, the passport 200 includes an indicator 210 that may also be visibly arranged on the inner side 204 to visually indicate the authentication result. In an embodiment, as shown in FIG. 5, the biometric sensor 206 is placed near an outside edge of the passport's inner side 204. However, it is contemplated that the sensor 206 can be placed anywhere on the passport 204 including the outer side of the passport 204.

In another embodiment, the conventional photograph of the passport owner 208 can be replaced with a illuminating display 126 (FIG. 1A), whereby the display 126 would show the owner's picture and/or other relevant information (e.g. signature) when the card 202 is properly authenticated. In another embodiment, the display 126 (FIG. 1A) and the sensor 206 can be integrated into one component, wherein the owner places her finger on the display 126 which then illuminates the owner's photograph and/or other information if the fingerprint is properly authenticated. The owner's image and other information can be displayed for a predetermined time period after the successful authentication. Alternatively, the owner's image and other information can be displayed while the owner's finger remains in contact with the fingerprint sensor 206.

It is preferred that the size of the card 202 is smaller than that of the passport 200. As described above in the embodiments, the card 202 includes the power antenna, signal antenna, power circuit, biometric sensor, authentication indicator, AUTH CPU, SEC CPU, and the control interface. The card 202 can include the other components as well, as described above in the embodiments. The details of the components in the card 202 are discussed above and are not provided again herein.

Figure 6A:
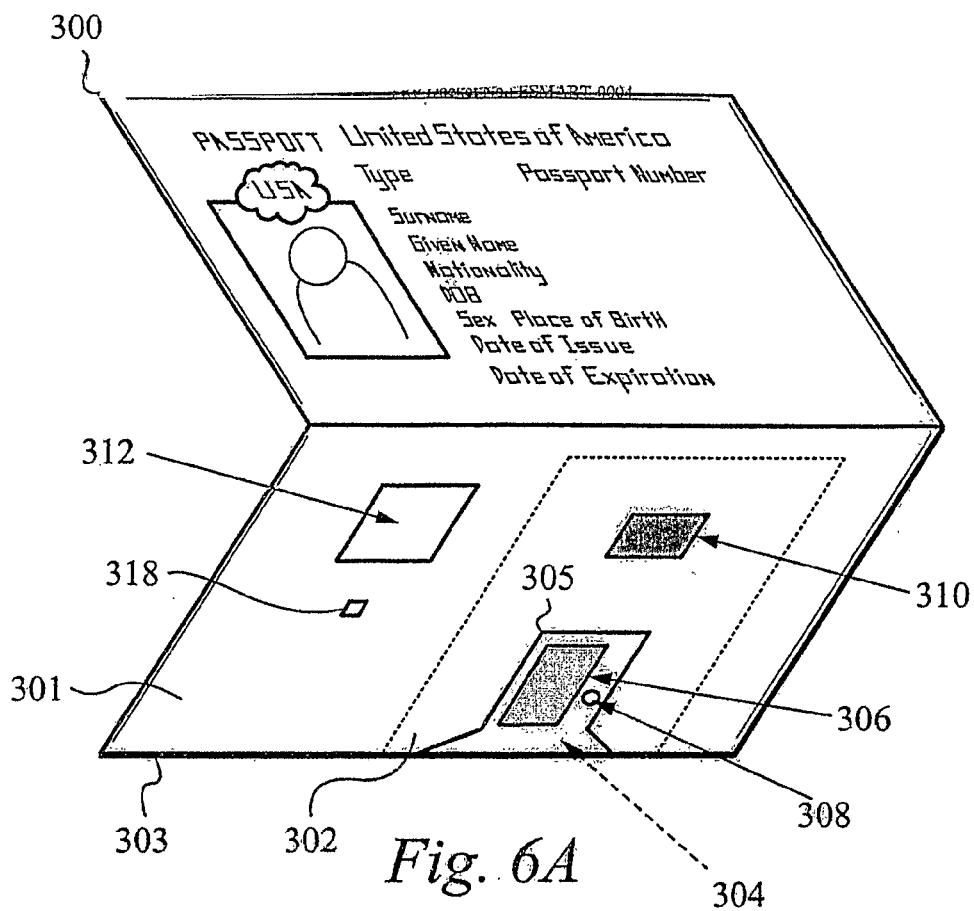
FIG. 6A illustrates another electronic passport having a removable authentication card in accordance with an embodiment of the invention.

FIG. 6A illustrates a passport having a modular slot for receiving the authentication card of the invention. In the embodiment shown in FIG. 6A, the passport 300 includes a slot 302 which is designed to receive the authentication card 304 discussed above. The slot 302 allows the card's owner to insert her card 304 into the passport 300 while traveling, whereby the passport 300 is electronically activated when the card 302 is properly seated in the slot 302 and authenticated. The card owner can also remove the card 304 from the slot 304 whenever she desires, thereby making the passport 300 inactive and inoperable. Since all information related to the card's owner is preferably held on the card 100, the card itself may be implemented as an electronic passport. However, it is appreciated that in some countries, a paper form of the passport is still desired. Thus, the user can activate her passport by sliding her authentication card 302 into the slot 302, whereby information printed on the passport as well as the identification information on the card 100 is available for viewing by the appropriate authorities. The passport 300 in the embodiment in FIG. 6A serves as an application in which the authentication card discussed in the present description is universal to authenticate the owner's identity in different situations and scenarios.

Figure 6B:
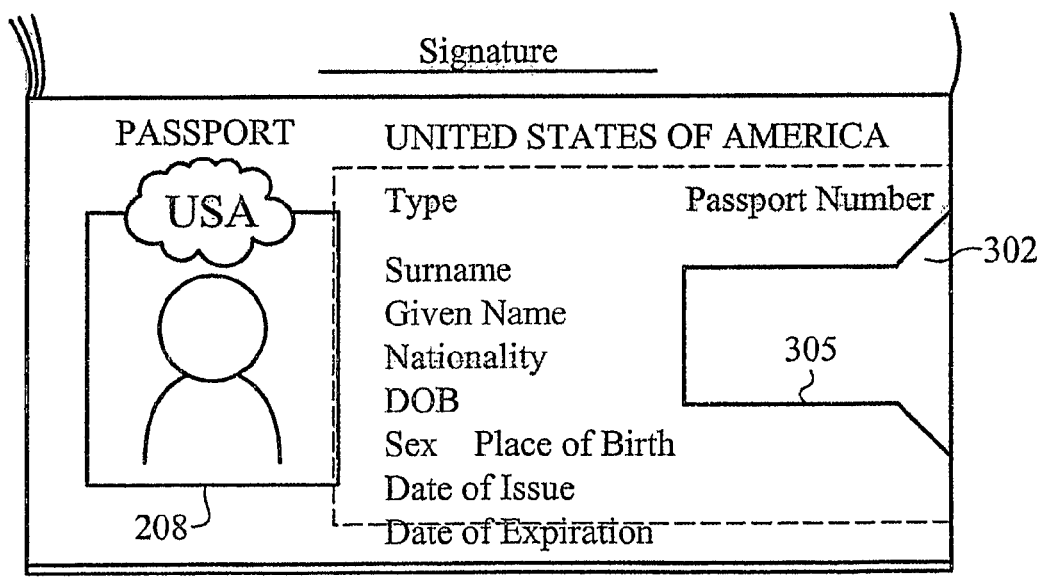
FIG. 6B illustrates another electronic passport having a removable authentication card in accordance with an embodiment of the invention.

As shown in FIG. 6A, the slot 302 is preferably defined between two sheets of paper 301 and 303 in the passport booklet or inside the booklet cover, whereby a notch 305 is shown cut out of the top sheet 301. Alternatively, the top sheet 301 is not present and the slot 302 is completely exposed when the card 302 is not inserted therein. The passport 300 preferably includes an ISO contact 310 within the slot 302 which is positioned to come into contact with the ISO contact 118 (FIG. 1A) on the card 304 when the card 304 is properly seated in the slot 302. When properly seated, the biometric sensor 306 of the card 304 is preferably exposed through the notch 305. As shown in FIG. 6A, the slot 302 is arranged such that the card 100 can be inserted into the passport 300 from the side opposite of the spine of the booklet. Alternatively, the slot 302 can be arranged lengthwise as shown in an embodiment in FIG. 6B. The slot 302 can be arranged in any other orientation besides that shown in FIGS. 6A and 6B.

Figure 7:
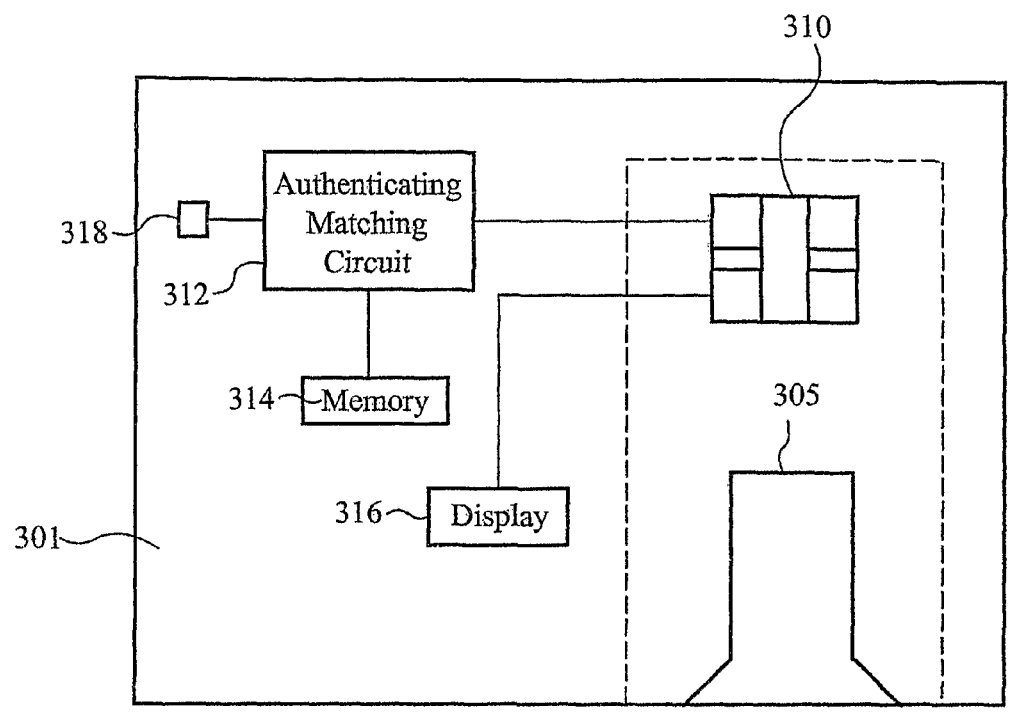
FIG. 7 illustrates a block diagram of the electronic passport having a removable authentication card in accordance with an embodiment of the invention.

Upon coming into contact with ISO contact 310, the passport 300 and the card 302 can perform an optional check using an authentication matching circuit 312 as shown in FIG. 7. As shown in FIG. 7, authentication matching circuit 312 is coupled to the ISO contact 310 which is preferably powered by the card 304. The authentication matching circuit 312 is shown coupled to a memory 314 which can store fingerprint and/or other information of the owner. Alternatively, the memory 314 only contains a key code which is compared to a corresponding key code stored in the card 304, whereby the matching circuit compares whether the key codes are the same when authenticating whether the card 304 matches the passport 300. Alternatively, a one time, limited life encrypted signal, discussed above, can be passed between the ISO contact 310 and the matching circuit 312. This is preferred considering that the least amount of electronic information about the owner should be stored in the modular passport 300. In an embodiment, the photograph illuminating display 316 in the passport 300 is coupled to the ISO contact 310, although not necessarily.

The modular passport 300 is preferably not independently powered and receives power from the card 304 when coupled thereto. Alternatively, the passport 300 includes a power antenna and/or a signal antenna which functions in the same way as the power and signal antenna of the card 304. Upon the card 304 being inserted into the slot 302, and the passport 300 placed near a terminal module 600, the card 304 becomes powered. The user is then able to place her finger on the biometric sensor 306, whereby the card 304 will perform the authentication process as discussed above. The passport 300 can include an indicator light 318 separate from the indicator light 308 on the card itself, whereby the passport indicator light 318 will illuminate the authentication result. The secondary indicator light 318 provides an inexpensive way to show an official (e.g. Customs Agent) that the person authenticating the card is indeed the person who the passport 300 belongs to. As stated above, an alternative embodiment includes the authentication matching circuit 312 embedded in the card 300, whereby the indicator light 318 is connected to the authentication matching circuit 312.

Figure 8:
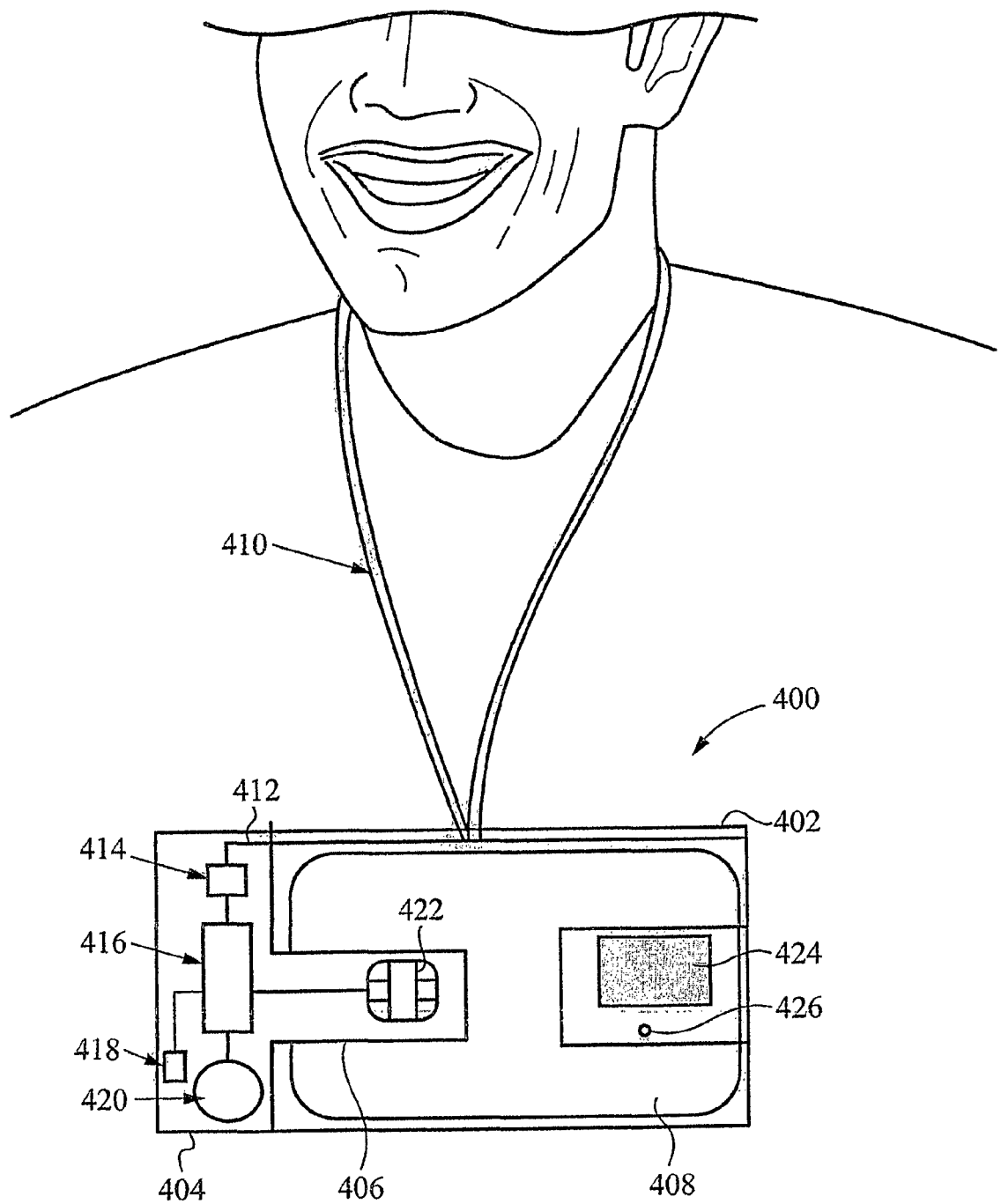
FIG. 8 illustrates a block diagram of an externally powered long range authentication card in accordance with an embodiment of the invention.

FIG. 8 illustrates a schematic of a long range authentication system in accordance with an embodiment of the invention. As shown in FIG. 8, the long range authentication system 400 includes a body 402, a long range signal transmitter 404, a coupling mechanism 406. The system 400 includes the authentication card 408 discussed in the embodiments above. In an embodiment, the body 402 of the system 400 houses long range transmitter 404 as well as the coupling mechanism 406, whereby the authentication card 408 can be inserted and removed from the body 402 as desired. The body 402 can be made of a durable hard plastic, vinyl, rubber, metal, alloy or a composite, although other materials are contemplated. The system 400 can be used indoors or can be used outside in harsh weather conditions. It should be noted that the system 400 depicted in FIG. 8 is not to scale and can be of any size.

The long range transmitter 404 in the embodiment in FIG. 8 includes a long range antenna 414, a microwave circuit 416, a GPS related circuit 418 and a battery 420. The microwave circuit 416 is shown coupled to an ISO connector 422 in the coupling mechanism 406 as well as the long range antenna 414. The microwave circuit 416 converts the signals from the card 408, which would be sent via the ISO contact 422, into microwaves which can be transmitted via the long range antenna 416. It should be noted that other circuits are contemplated besides the microwave circuit (e.g. RF circuit), and the invention in FIG. 8 is thus not limited to the microwave circuit. An optional long range neck-strap antenna 410 can be coupled to the long range antenna 414 via line 412, whereby the neck strap antenna 410 allows the system 400 to hang from around the owner's neck and further increases the range of the card by acting as an additional antenna which may be coupled to the antenna 414 via line 412 and/or to the card's internal antenna. The long range antenna 414 allows signals to be received at a card reader from a range of up to approximately 300 meters. However, it is contemplated that further distances can be achieved (e.g. 1000 meters).

The coupling mechanism 406 is configured to attach the card 408 thereto by mechanical means, although it is not necessary. The ISO contact 422 on the coupling mechanism 406 is positioned to come into contact with the corresponding ISO contact on the card 408. When the card 408 is coupled to the long range transmitter 404 via the ISO contact 422, the card 408 is powered by the battery 420 which thereby powers the biometric sensor 424, authentication indicator 426 and internal components (not shown) of the card 408. It should be noted that an external power supply instead of the battery 420 can alternatively be used to power the long range transmitter 400.

The system 400 in FIG. 8 can also include a Global Positioning Satellite ("GPS") transponder which comprises the GPS system 418 and an antenna which is integrated with the long range antenna 414 or separate from the long range antenna (not shown). The integral GPS transponder 418 can provide useful information about the current location of the card 408 at or about the time information is sent from the long range system 400. In particular, the location data from the GPS transponder 418 may be used to track the location of an individual approaching the reader. For example, military personnel at a checkpoint can detect an individual wearing the portable system 400 from a safe distance away using the GPS transponder 418 and request the individual to authenticate herself before coming too close to the checkpoint perimeter. Alternatively, or additionally, the GPS transponder 418 allows tracking of the system 400 and disabling (either permanently or temporarily) of the card 408 in the event that the card 408 is removed to a location where it is not authorized. Position may also be automatically determined by means other than GPS, for example using PHS (Japanese Cellular Telephone) caller location technology, or location sensors responsive to local variations in the earth's electromagnetic fields. Details of the GPS transponder 418 are generally known and are not discussed in detail herein.

Figure 9:
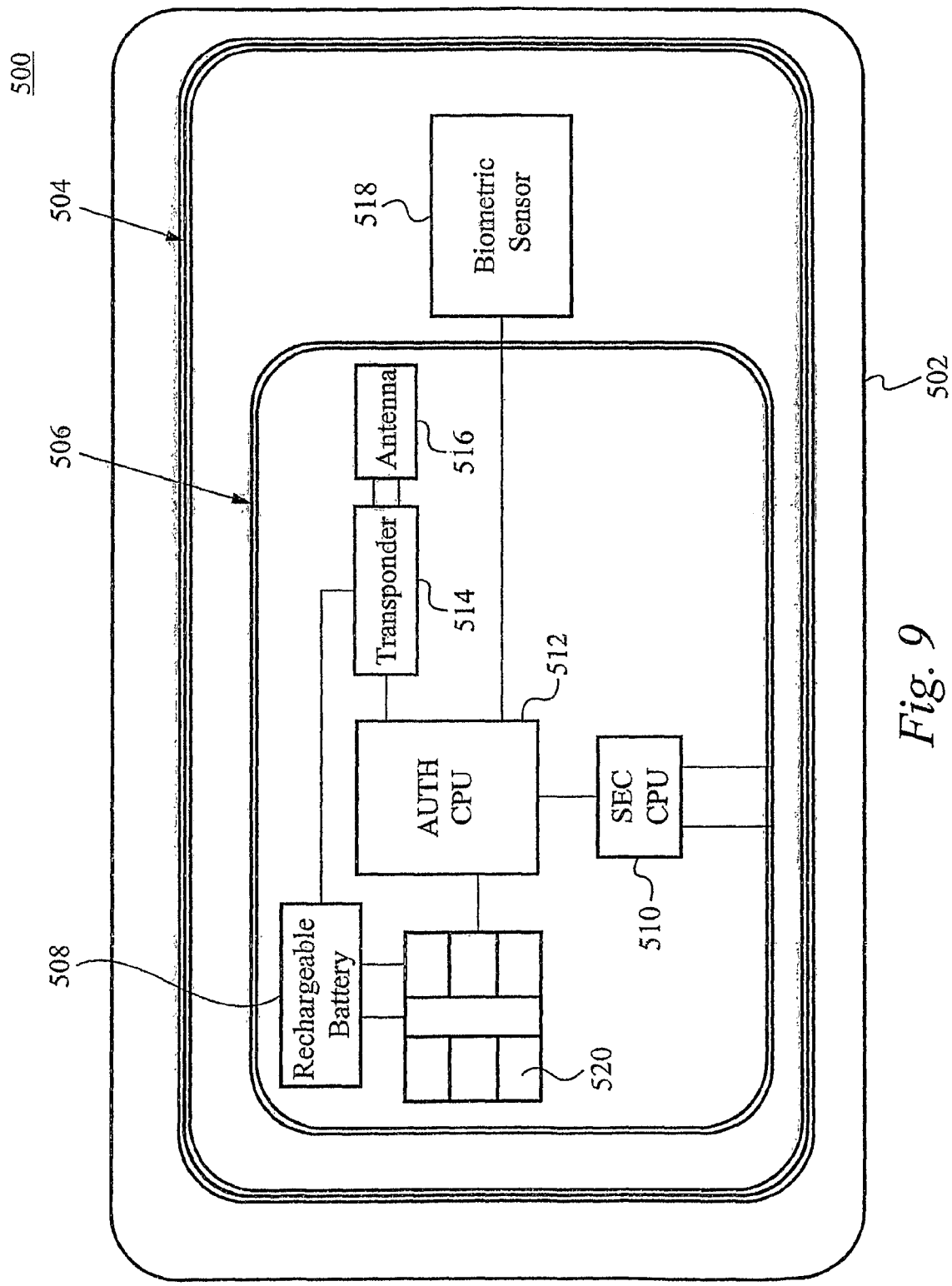
FIG. 9 illustrates a block diagram of an internally powered long range authentication card in accordance with an embodiment of the invention.

FIG. 9 illustrates an authentication card with internal short and long range transmitting capabilities in accordance with an embodiment of the invention. As shown in the embodiment in FIG. 9, the card 500 includes a substrate 502, a power antenna 504, a signal antenna 506, a battery 508, a SEC CPU 510, an AUTH CPU 512, a transponder circuit 514, an long range antenna 516, a biometric sensor 518 and an ISO contact 520. It is contemplated that additional or alternative components may be configured in the card 500. The power antenna, 504, signal antenna 506, SEC CPU 510, AUTH CPU 512 and sensor 518 have already been described and are not described again herein.

The battery 508 is shown coupled to the transponder circuit 514 and long range antenna 516, whereby the battery 508 powers the transponder circuit 514 which thereby allows the antenna 516 to transmit the authentication information from the AUTH CPU 512 over a long range distance to the card reader 600. It is preferred that the authentication information can be transmitted by the antenna 516 up to 300 meters to a card reader, however further distances are contemplated (e.g. 1000 meters). The antenna 516 is preferably a microwave antenna, such as a chip scale antenna or other RF capable antenna. The AUTH CPU 512 can selectively turn off the transponder circuit 514 and antenna 516 to utilize just the signal antenna 506 for short range transmission. This can be controlled by the user, the card reader, or automatically by the amount of power received at the card 500

The battery 508 can be a rechargeable battery which is embedded in the substrate 502, whereby the battery 508 is recharged when the card 500 is in contact with the terminal module via the ISO contact 520. In another embodiment, the rechargeable battery 508 is coupled to the power antenna 504, whereby the battery 508 is recharged when the power antenna 504 wirelessly receives power from the terminal module 600.

FIG. 10 illustrates a terminal module, also referred to as card reader 600 which powers and communicates with the card 100 during the authenticating process. The card 100 referred to herein for the present example is the embodiment described in FIG. 1A, however any of the embodiments described above can be applied to the present example. The terminal module 600 preferably includes a support plate 602 and an antenna 604 provided thereon. The card 100 can be placed on top of or in close proximity to the support plate 602, wherein the support plate 602 has a size suitable to receive the card 600. The antenna 604 preferably transmits electromagnetic waves which excite the power antenna 104 of the card 100 when the card 100 is brought within a predetermined distance of the terminal module 600. The distance depends on the frequency of the electromagnetic waves as well as the voltage applied through the terminal module antenna 604. As the card 100 is brought toward the terminal module 600, the electromagnetic waves cause power to gradually increase in the power antenna 104. In an embodiment, when the card 100 is placed on the terminal module 600, the current received at the power antenna 104 is at a maximum in order to operate the card 100. The power of the module 190 is also adapted to receive a signal transmitted from the antenna of the card 600.

In an embodiment, the terminal module 600 also includes a signal antenna 606 which is configured to communicate with the signal antenna 106 in the card 100. The terminal module 600 can include as an encrypting as well as decrypting modules which allow secure information exchange with the card 100. However, as stated above, it is preferred that information stored on the card 100 (i.e. SEC CPU data) is not transmitted via the signal antenna 106. Instead, it is preferred that if information is to be transmitted between the card 100 and the terminal module 600, that key codes or other non-sensitive data be sent.

In an embodiment, the terminal module 600 can also include an ISO contact which communicates with the ISO contact 118 on the card 100 for wired communication. In an embodiment, the terminal module 600 can include a display, an authentication indicator, a writing display as well as other input and output devices, memories, processors, antennas and/or network connections.

Figure 12:
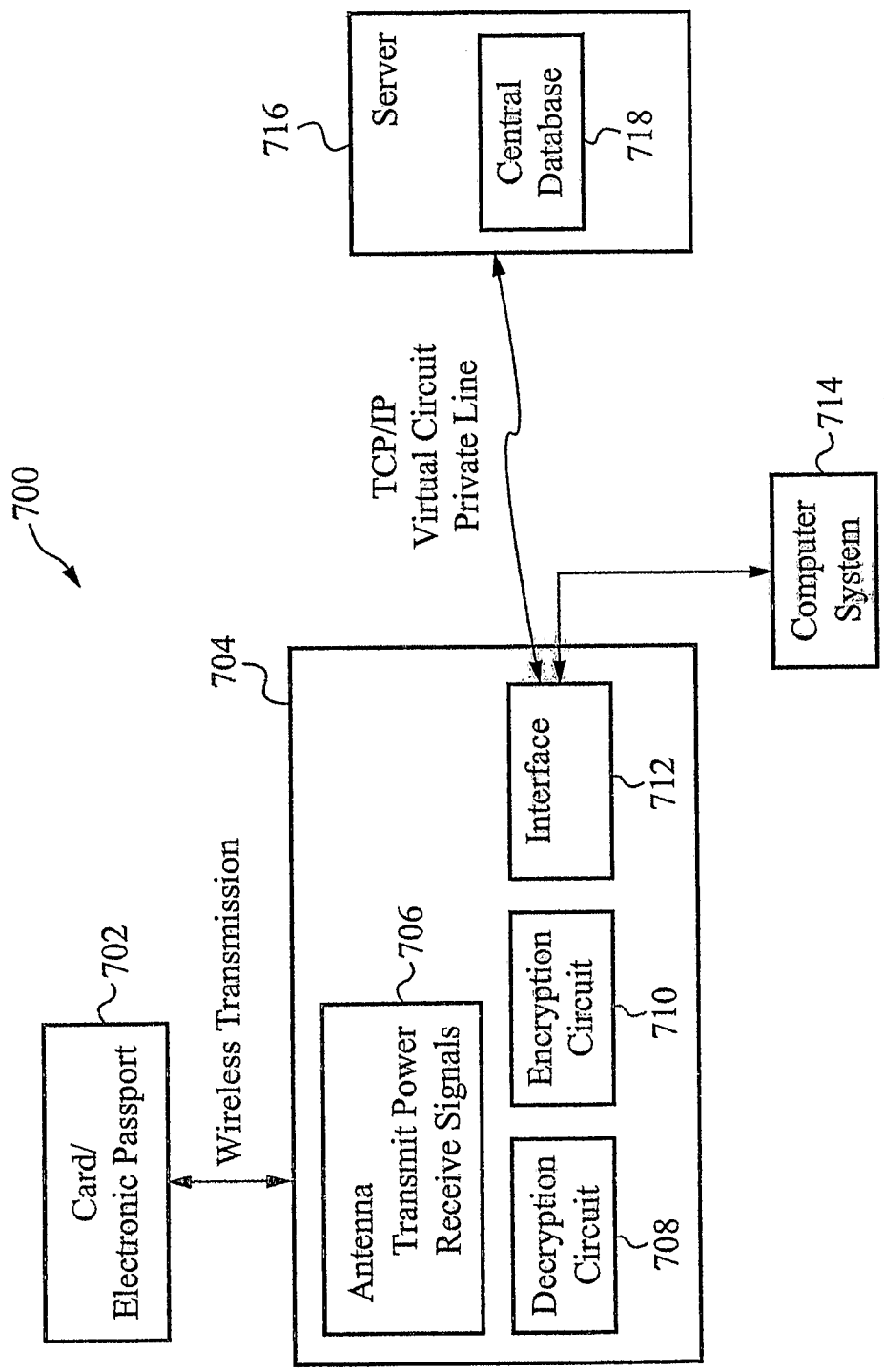
FIG. 12 illustrates a diagram of a system for authenticating a person holding the card in accordance with an embodiment of the invention.

FIG. 12 illustrates a system 700 for authenticating a person holding the card 100 in accordance with an embodiment of the invention. It should be noted that the system 700 can also be used in conjunction with any of the electronic passport embodiments and/or the long range transmitter embodiments. As shown in FIG. 12, the system 700 includes a card and/or electronic passport 702 and a terminal module 704. The terminal module 704 includes a terminal module antenna 706, a decryption circuit 708, an encryption circuit 710, and a control interface 712.

The decryption circuit 708 is adapted to decrypt signals received from the card/electronic passport 702, in an embodiment where the received signals are encrypted. The encryption circuit 712 encrypts signals to be transmitted from the terminal module 704. The interface 712 couples the terminal module 704 to a computer system 714 which can be a local computer network, server, database, world wide web, secure terminal or the like. A connection to the server 716 may use the Transmission Control Protocol/Internet Protocol (TCP/IP), via a virtual circuit, a private line, or the like. Thus, the interface 712 may be compatible with one of the Universal Serial Bus (USB) standard, Recommended Standard 232C (RS-232C), Recommended Standard 433 (RS-433), Transmission Control Protocol/Internet Protocol (TCP/IP) or the like. The computer system 714 and/or the server 716 receives the authentication signal and other information transmitted from the terminal module 704, and performs necessary data processing, screening, and comparison with the central database 718. In addition, the authentication result and/or personal information may be displayed to the authorized personnel via a display or print out.

Figure 13:
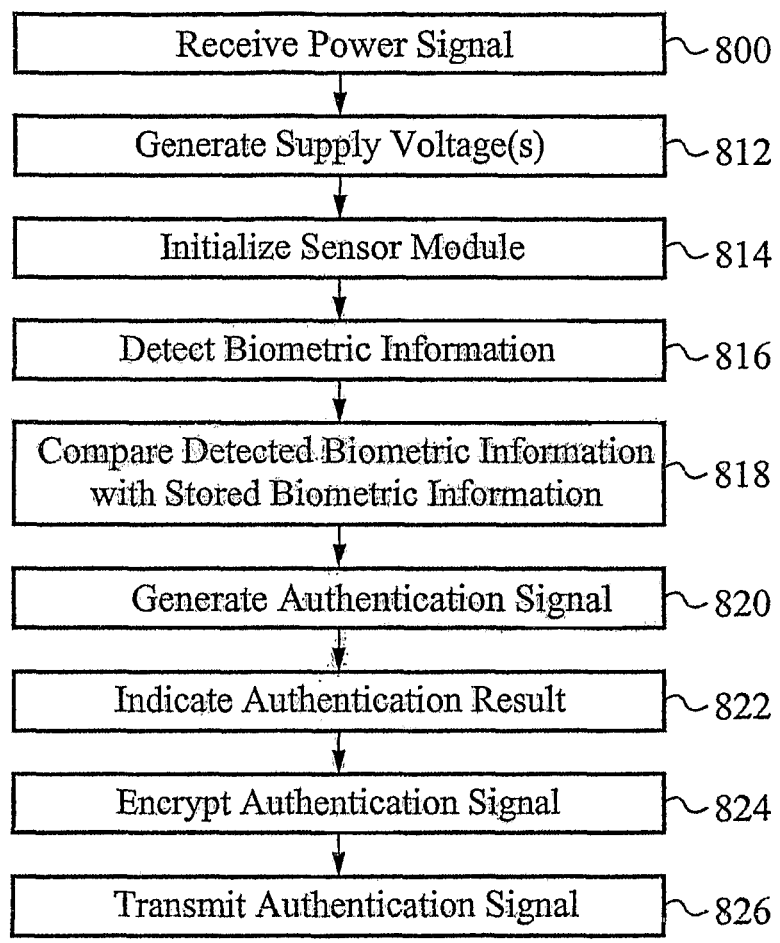
FIG. 13 illustrates a flow diagram of a method for authenticating a person holding the card in accordance with an embodiment of the invention.

Under certain circumstances, it may be preferable to communicate the biometric information and/or personal information of an individual with an external system beyond the terminal module. For example, in the airport, the authentication result may be monitored by the airport security personnel, and the authentication result and necessary personal information may be transmitted to a monitoring device/terminal within a local computer network. In addition, in some suspicious cases, the biometric information such as fingerprints may need to be screened against that contained in a criminal record, terrorist list database, immigration records, and the like, which are typically maintained in a government central database. For example, when the card or electronic passport might have been counterfeited, all of the information stored in the suspicious card or passport may need to be examined and compared against the corresponding information of a legitimate individual as claimed to be. Thus, the terminal module may also have a capability of communicating with outside computer system in accordance with an embodiment of the invention FIG. 13 illustrates a flow chart showing the process by which the authentication card operates in accordance with an embodiment. As the card is brought in close proximity to the terminal module, the power antenna in the card gradually gains current which is electromagnetically transmitted from the power antenna of the terminal module (Step 800). As the amount of current reaches a predetermined level in the power antenna in the card, at least one supply voltage is generated from the power signal, and the supply voltage is provided to the sensor module (Step 812) so as to power up and enable the sensor module to operate. Optionally, initialization of the sensor module may be performed during the power up period (Step 814). Then, biometric information is detected from the person's body (Step 816), using the biometric sensor, such as a fingerprint sensor, biosensor, or the like. The detected biometric information is compared with biometric information stored in the memory (Step 818), and an authentication signal representing a result of the comparing is generated (Step 820). The result of the authentication or comparison is optionally indicated using an indicator provided on the card (Step 822). The authentication signal is then optionally encrypted (Step 824) and transmitted via the wireless transceiver module (Step 826).

Since the card therein is powered by the power wirelessly transmitted from the terminal module, as the card is removed from the terminal module and taken a further distance away from the terminal module, the supply voltage in the power antenna reduces and eventually shuts down, thereby turning off the AUTH CPU 114 and/or any other components in the card 100.

An exemplary enrollment system and process utilizing the card of the invention will now be discussed. In the enrollment process, the applicant initially fills out an application, on paper or electronically, and submits it to the appropriate issuing authority. The applicant preferably includes a photograph or has a photograph taken and provides one or more fingerprints. The issuing authority may take additional steps to ensure the identity of the applicant by reviewing drivers license information, social security information, credit reports, government and commercial database crosschecks, etc.

After the applicant's identity has been verified, the applicant's information, deemed necessary by the card issuer, is loaded onto the card using any methods described herein or known in the art. The applicant puts her fingerprint on the biometric sensor on the card, whereby the fingerprint is captured and stored in a memory in the card which is external or integrated with the AUTH CPU. Once the fingerprint along with the associated owner's information is satisfactorily loaded onto the card, the control interface receives a spiked voltage which burns out certain fuses in the card which prevents anyone from writing to the card. At that point, the card can only be read or written to through the ISO contact or wireless signal antenna.

The appendix (15 pages) attached herewith is part of the disclosure and provides additional description of embodiments of the present invention. While certain embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A wireless power authentication card associated with an owner comprising:
    a power antenna adapted to wirelessly receive power from an external powering device;
    a biometric sensor;
    an authentication processor coupled to the biometric sensor and configured to authenticate the sensed biometric information, the authentication processor capable of being powered by the power antenna;
    a security transaction processor configured to receive an authentication signal from the authentication processor when the authentication processor authenticates the sensed biometric information, wherein the authentication processor terminates power to the security transaction processor after the security transaction processor receives the authentication signal from the authentication processor; and
    a signal antenna coupled to the security transaction processor, wherein the security transaction processor provides authentication information stored by the security transaction processor wirelessly via the signal antenna when power to the security transaction processor is terminated.

2. The wireless power authentication card of claim 1 wherein the authentication processor is configured to send an authentication signal to the security transaction processor after a successful authentication, wherein the authentication signal is usable by the security transaction processor a predetermined number of times, a predetermined amount of time, or only once.

3. The wireless power authentication card of claim 1 further comprising an internal clock circuit, wherein the internal clock circuit is activated when the power antenna wirelessly receives power, the internal clock circuit configured to match a clock signal to a frequency of the wirelessly received power.

4. The wireless power authentication card of claim 1, wherein the card is used with a terminal module including a module antenna adapted to receive signals from the signal antenna, and wherein the signal antenna is placed on a proximity position on a loop or trace of the module antenna.

5. The wireless power authentication card of claim 1, wherein the power antenna has a turn number less than 5, wherein the power antenna is formed as an etched or printed pattern on a substrate, and wherein the biometric sensor comprises a thinned silicon substrate having a thickness less than 200 microns.

6. The wireless power authentication card of claim 1 wherein the biometric sensor captures an image of the person includes at least one of: a face of the person; an ear of the person; an iris of the person; and a retina of the person.

7. A wireless power authentication system comprising:
    a) a card reader;
    b) a card associated with an owner, the card further comprising:
        1) a power antenna adapted to wirelessly receive power from the card reader;
        2) a biometric sensor;
        3) an authentication processor coupled to the biometric sensor and configured to authenticate the sensed biometric information, the authentication processor capable of being powered by the power antenna;
        4) a security transaction processor configured to store information associated with the owner and coupled to the authentication processor, wherein the authentication processor terminates power to the security transaction processor after sending an authentication signal to the security transaction processor as a result of a successful authentication of the sensed biometric information; and
        5) a signal antenna coupled to the security transaction processor, wherein the security transaction processor provides the information associated with the owner wirelessly to the card reader via the signal antenna when power to the security transaction processor is terminated.

8. A method of authenticating a card associated with an owner, the system comprising:
    wirelessly receiving power from an external powering device;
    sensing biometric data of the owner;
    authenticating sensed biometric authentication of the owner using a first processor;
    wirelessly transmitting information associated with the owner stored in a second processor, wherein the second processor is coupled to the first processor and is only accessed as a result of a successful authentication of the sensed biometric information by the authentication processor, and wherein the second processor wirelessly transmits when its power is terminated by the first processor in response to the successful authentication.

9. A wireless power authentication card, comprising:
    a power antenna;
    a power circuit coupled to the power antenna;
    a first CPU for biometric authentication;
    a second CPU for security transaction, the second CPU including a wireless interface, the wireless interface being activated only if the second CPU receives no power from the power circuit and no signal from the first CPU;
    an ISO contact interface coupled to the first CPU, the ISO contact providing an external communication to the card;
    a signal antenna coupled to the second CPU, the signal antenna providing a wireless communication channel to the card; and a fingerprint sensor coupled to the first CPU, wherein the second CPU is only accessed by the first CPU as a result of a successful biometric authentication by the first CPU.

10. The wireless power authentication card of claim 9, wherein the power circuit further comprises: a rectifier coupled to the power antenna, wherein the rectifier comprises a Schottky diode; and a regulator coupled to the rectifier.

11. A wireless power authentication card, comprising:
a power antenna;
a power circuit coupled to the power antenna;
a first CPU for biometric authentication;
a second CPU for security transaction, the second CPU including a wireless interface, the wireless interface being activated only if the second CPU receives no power from the power circuit and no signal from the first CPU;
a signal antenna coupled to the second CPU, the signal antenna providing a wireless communication channel to the card; and a fingerprint sensor coupled to the first CPU, wherein the second CPU is only accessed by the first CPU as a result of a successful biometric authentication by the first CPU.

* * * * *